United States Patent
Savastinuk et al.

(10) Patent No.: US 11,599,811 B1
(45) Date of Patent: Mar. 7, 2023

(54) GENERATING EVENT RESULTS USING AUTO-GENERATED SENSOR DATA

(71) Applicant: Amazon Technologies, Inc., Seattle, WA (US)

(72) Inventors: Paul Aksenti Savastinuk, Bainbridge Island, WA (US); Roman Talyansky, Haifa (IL); Michael Dillon, Seattle, WA (US); Eli Osherovich, Haifa (IL); Gopi Prashanth Gopal, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1052 days.

(21) Appl. No.: 16/022,338

(22) Filed: Jun. 28, 2018

(51) Int. Cl.
*G06N 5/04* (2006.01)
*G06Q 10/08* (2012.01)
*G06N 20/00* (2019.01)
*G06Q 10/087* (2023.01)

(52) U.S. Cl.
CPC ............ *G06N 5/041* (2013.01); *G06N 20/00* (2019.01); *G06Q 10/087* (2013.01)

(58) Field of Classification Search
CPC ....... G06N 5/041; G06N 20/00; G06Q 10/087
See application file for complete search history.

(56) References Cited

U.S. PATENT DOCUMENTS

| | | | |
|---|---|---|---|
| 9,117,106 B2 | 8/2015 | Dedeoglu et al. |
| 9,235,928 B2 | 1/2016 | Medioni et al. |
| 9,473,747 B2 | 10/2016 | Kobres et al. |
| 2013/0284806 A1 | 10/2013 | Margalit |

*Primary Examiner* — Robert G Bachner
(74) *Attorney, Agent, or Firm* — Lee & Hayes, P.C.

(57) ABSTRACT

This disclosure describes systems and techniques for detecting events, determining a result of each respective event using a first hypothesis source, and calculating a likelihood that a second (and/or additional) hypothesis source would determine the same result of the respective event. The calculated likelihood may then be used to be determine whether to request that the second hypothesis source determine the result of the event, determine an amount of resources of the second hypothesis source to use to make this determination, and/or like.

23 Claims, 6 Drawing Sheets

GENERATING EVENT RESULTS USING AUTO-GENERATED SENSOR DATA

BACKGROUND

Retailers, wholesalers, and other product distributors typically maintain an inventory of various items that may be ordered, purchased, leased, borrowed, rented, viewed, and so forth, by clients or customers. For example, an e-commerce website may maintain inventory in a fulfillment center. When a customer orders an item, the item is picked from inventory, routed to a packing station, and packed and shipped to the customer. Likewise, physical stores maintain inventory in customer accessible areas, such as in a shopping area, and customers can pick items from inventory and take them to a cashier for purchase, rental, and so forth. Many physical stores also maintain inventory in a storage area, fulfillment center, or other facility that can be used to replenish inventory located in the shopping areas or to satisfy orders for items that are placed through other channels (e.g., e-commerce). Other examples of entities that maintain facilities holding inventory include libraries, museums, rental centers, and the like. In each instance, for an item to be moved from one location to another, the item is picked from its current location and transitioned to a new location, users may move about within the facility, and so forth. It is often desirable to generate information about events occurring in the facility.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
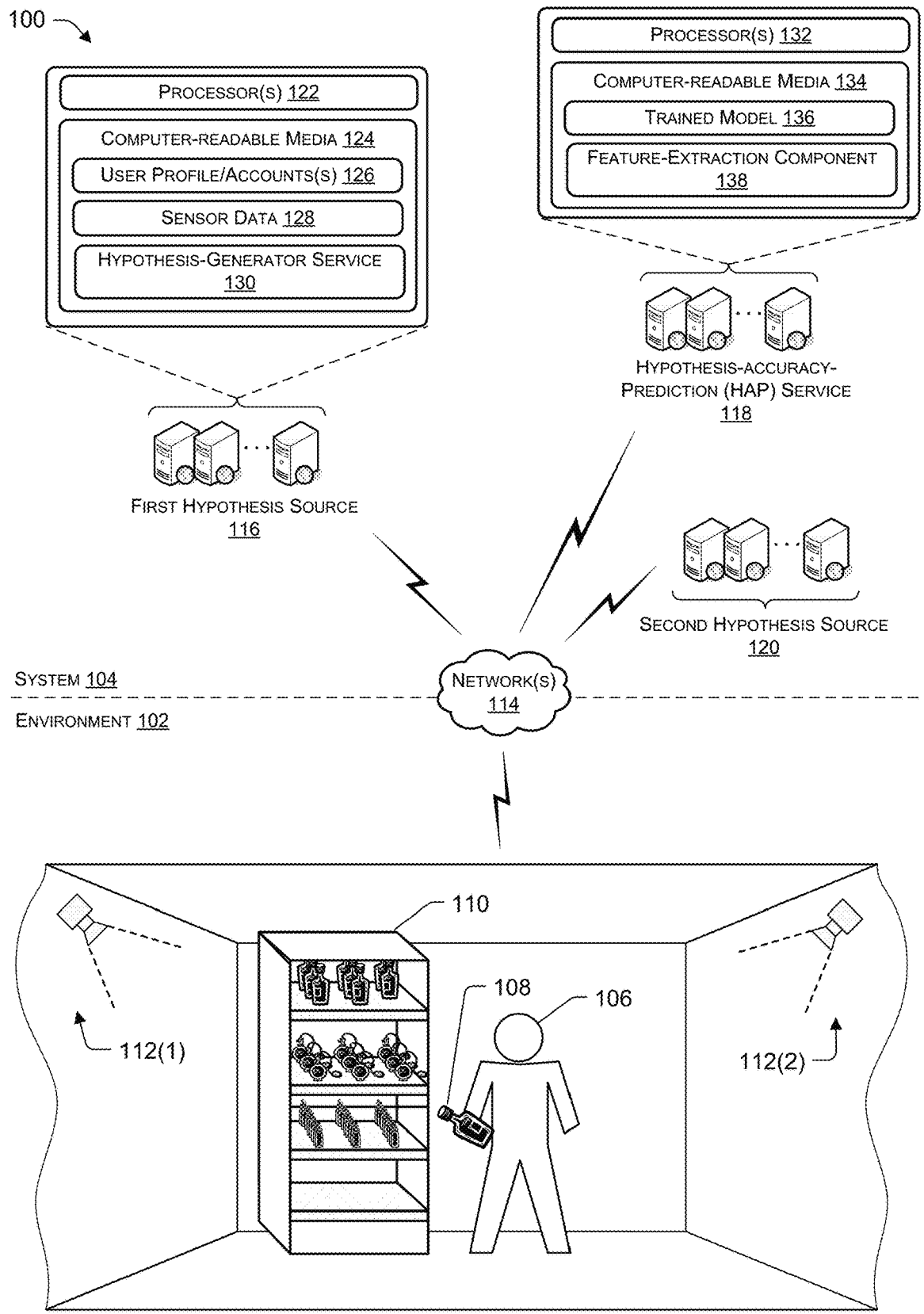
FIG. 1 illustrates an example architecture that includes one or more sensors in an environment to generate sensor data for use in identifying one or more events that occur within the environment, such as a user picking an item from an inventory location in the environment. This sensor data may be sent to a remote service that may include a first hypothesis source for determining a result of the event, as well as a hypothesis-accuracy-prediction (HAP) service for determining a likelihood that a second hypothesis service would agree with the result determined by the first hypothesis service, which may be used in determining whether to request that the second hypothesis service also attempt to determine a result of the event.

This disclosure describes systems and techniques for detecting events, determining a result of each respective event using a first hypothesis source, and calculating a likelihood that a second (and/or additional) hypothesis source would determine the same result of the respective event. The calculated likelihood may then be used to be determine whether to request that the second hypothesis source determine the result of the event, determine an amount of resources of the second hypothesis source to use to make this determination, and/or like.

In one example, the systems and techniques are used to detect events occurring within a materials handling facility (or "facility") and updating virtual shopping carts of respective users based on the detected events. The facility may include, or have access to, an inventory management system. The inventory management system may be configured to maintain information about items, users, condition of the facility, and so forth. For example, the inventory management system may maintain data indicative of a result of different events that occur within the facility, such as what items a particular user is ordered to pick, location of the particular user, availability of a user providing support services to others, requests for assistance, environmental status of the facility, and so forth. As such, as used herein a "result" of an event may comprise data representing some inference regarding the event, which may represent a particular value, indication that the event is inconclusive, or the like. That is, the result of an event may comprise any information deduced from automated or manual analysis of sensor data at least partly representative of the event. Further, it is to be appreciated that analysis of first data associated with an event may produce a first result. However, analysis of second data associated with the same event may produce a second result. Further, because these results are essentially calculated hypotheses of what the actual real-world result of the event was, the produced results may differ from one another and, potentially, from the real-world result of the real-world event.

Operation of the inventory management system may be supported by sensor data acquired by one or more sensors. The sensor data may include image data acquired by imaging devices such as cameras, information acquired from radio frequency tags, weight sensors, and so forth.

The inventory management system may use one or more hypothesis sources to determine, using the sensor data, occurrence of one or more events within the facility. Events may involve interactions between one or more items, inventory locations, users, totes, robots, changes in sensor operation, movement of objects, and so forth. For example, a user may remove an item from an inventory location. In another example, two or more users may move past one another or attempt to access the same inventory location contemporaneously. When the system described herein detects sensor data indicative of an event, the system may generate an event record that indicates the occurrence of the event.

The inventory management system, including one or more of the hypothesis source(s), may be configured to generate output data providing information indicative of the event using one or more machine learning or automated systems to process the sensor data. For example, one or more of the hypothesis sources may use artificial neural networks, classifiers, and so forth, may be used to process the sensor data (e.g., image data, load-cell data, etc.) of an event and identify the item that was removed from the inventory location, identify the users after they move apart, disambiguate if the user picked or placed an item from an inventory location, and so forth.

The inventory management system may be automated to provide the output data during operation. For example, the inventory management system may automatically identify an item removed from an inventory location as well as a user that removed the item. In response, the inventory management system may automatically update a virtual shopping cart of that particular user. However, in some situations, one or more additional hypothesis sources may also be used to verify or otherwise determine the result of the event. In some instances, the additional hypothesis source(s) comprises different artificial neural networks, classifiers, and so forth, while in other instances it may comprise one or more human users. In these situations, inquiry data may be provided to an associate service that provides the inquiry data to one or more devices associated with one or more associates supporting operation of the facility. The users may then verify a result and/or determine a new result of the event.

The inquiry data may comprise at least a portion of the sensor data associated with the event. For example, the sensor data may comprise image data such as a video clip or still image showing the user interacting with an item. An associate user interface presents at least a portion of the image data and generates response data indicative of the input from the associates. In some implementations, the inquiry data may also comprise tentative results of the events. For example, the tentative results may comprise the possible results associated with the event as generated by the first hypothesis source. Continuing the example, tentative results may comprise a list of the possible items the user may be interacting with. The response data may comprise data indicative of a selection by the associate of one or more of the tentative results. The response data may then be used to update the virtual shopping cart of a user, similar to how a virtual shopping cart may be updated after automatically determining this information.

As noted above, the system may use sensor data to determine occurrence of an event, such as a user picking an item form a shelf in the facility. The system may use this sensor data to associate a result to an event record associated with this event, such as indication of an item identifier of the item picked, a number of the total items picked, a user that picked the item, etc. Further, the system may calculate a confidence value associated with the determined result. If this confidence value is higher than a first threshold confidence value, then the result associated with the event may be deemed high-confidence and, therefore, the system may store the result of the event. If, however, the confidence value is lower than the threshold confidence value, then the system may deem the result associated with the event low-confidence.

Furthermore, in response to the result being deemed low-confidence, the system may determine a likelihood that a second (and/or additional) hypothesis source would also determine the same result associated with the event. For instance, the system may extract feature data associated with the event, and potentially feature data based on historical data, and may input this feature data into a trained model (or classifier). The model may comprise a convolutional neural network (CNN), a random-forest model, and/or the like. The trained model may then output, for example, a numerical value indicating a likelihood that the second hypothesis source would determine the same result of the event if the second hypothesis source were to analyze some or all of the sensor data. For example, the trained model may output a numerical value indicating a likelihood that one or more human associates would determine the same result as the first hypothesis source.

The system may then compare this numerical value to another a threshold. In some instances, in response to determining that the value is greater than the threshold, the system may re-designate (or "promote") the result of the event as high-confidence. That is, given that the trained model may predict with relatively high accuracy that the second hypothesis source will confirm the result of the event, the system may save the cost of having the second hypothesis source analyze data to make this determination and may, instead, promote the result of the event from low-confidence to high-confidence. In response to the result being deemed high-confidence, the system may then store the result of the event.

If, however, the numerical value output by the trained model is less than the threshold, then the system may determine whether the value is greater than yet another, lower threshold. If so, then the system may request determination of the result of the event from fewer resources than if the numerical value is not greater than this lower threshold. For example, the system may request analysis of the event by a lesser amount of the second hypothesis source (e.g., a lesser number of human associates), by a lesser amount of discrete, additional hypothesis sources, or the like. In one example, if the numerical value is greater than the lower threshold, the system may request that a first instance of the second hypothesis source determine a result of the event. If the first instance determines the same result, then the system may re-designate the result of the event as high-confidence and, thus, may store the result. If, however, the first instance determines a different result, or if the initial numerical value determined by the trained model is not greater than the lower threshold, then the system may request a greater number of instances of the second hypothesis source (and/or a greater number of different hypothesis sources) determine the result of the event. For example, if the first instance of the second hypothesis source disagrees with the initial result, or if the initial numerical value is less than the lesser threshold, then the system may request three (total) instances of the second hypothesis source determine the result. If at least two of the three instances agree upon a result, then that result may be associated with the event (as high-confidence) and stored as a final result. If, however, a majority decision is not determined, the event may be escalated to yet additional hypothesis source(s) and/or additional instances of the first and/or second hypothesis sources.

Regardless of route by which an event is deemed high-confidence, in response to the result being assigned this state the inventory management may update the virtual shopping cart of a user to indicate the result of the event (e.g., that the user obtained a particular box of cereal). Therefore, when the user requests to finalize a transaction with a provider of the system (e.g., request to pay for items in the user's shopping cart), the inventory management system may charge a payment instrument of the user for a cost of all items designated in the virtual shopping cart, including the box of cereal.

As noted above, the inventory management system may determine a first result of an event and, thereafter, modify that result (e.g., generate a new result for that event). For instance, a first hypothesis source may analyze sensor data to automatically determine a result of an event, such as that a particular user grabbed a particular box of cereal (e.g., "Acme Cereal"). If, however, the confidence value associated with this result is less than a first threshold confidence value, and the trained model outputs a value indicating a likelihood of agreement by a human associate that is less than a second threshold value, the sensor data may be sent to a client computing device for analysis by a human user. The human user may then analyze the sensor data (e.g., by watching video acquired by one or more cameras within the environment) to determine a different result of the event, such as the same or a different user selecting a different type of cereal than initially determined (e.g., "Oatmeal Cereal").

The following description describes use of the techniques within a materials handling facility. The facility described herein may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling. In other implementations, the techniques described herein may be implemented in other facilities or situations.

FIG. 1 illustrates an example architecture 100 depicting an environment 102, in which events occur, and a system 104 for determining respective results of the events. In some instances, some or all of the system 104 resides remotely from the environment while in other instances some or all of the system 104 resides within or proximate to the environment 102. As FIG. 1 depicts, in the illustrated example a user 106 picks an item 108 from a shelf 110 in the environment 102. For example, the shelf 110 may house one or more different types of items and the user 106 may pick (i.e., take) one of these items.

As illustrated, the environment may include one or more sensors, such as illustrated sensors 112(1) and 112(2). In this example, the sensors comprise image sensors configured to capture video data within the environment 102 for use in determining results associated with events, such as the picking of the item 108 by the user 106. While FIG. 1 illustrates example sensors, the sensors in the environment 104 may comprise any other type of sensor, such as weight sensors (e.g., load cells), microphones, and/or the like, as described in detail below.

In some instances, the sensors in the environment 102 may periodically or continuously send data to the system 104 via one or more networks 114. The network(s) 114 may represent one or more of any type of wired and/or wireless networks. After receiving the sensor data, the system 106 may attempt to identify events that have occurred in the environment 102, along with respective results associated with these events. For example, the system 104 may attempt to determine which items users, such as the user 106, picked, which items they returned, who entered or exited the environment, and so forth. The system 104 may then store results of the events, such as in association with a profile or account of a user.

As illustrated, the system 104 includes a first hypothesis source 116, a hypothesis-accuracy-prediction (HAP) service 118, and a second (and potentially additional) hypothesis source 120. The system 104 may receive sensor data, detect events represented by the data, and attempt to determine what happened as part of each event. For instance, upon detecting an occurrence of an event at a particular time, the system 104 may route sensor data corresponding to a defined time range around the particular time to the first hypothesis source 116 to attempt to determine a result of the event. In some instances, the first hypothesis source 116 may comprise a neural network, classifier, or other algorithm-based technology for analyzing the sensor data and determining an event result. In other instances, the first hypothesis source 116 may comprise one or more computing devices operated by respective human users who analyze the sensor data to determine the result of the event.

In this example, the first hypothesis source 116 comprises one or more processors 122 and one or more computer-readable media 124, which stores or otherwise has access to one or more user profiles or accounts 126, current or past sensor data 128, and a hypothesis-generator service 130. The user profiles/accounts 126 may store indication regarding users, such as user preferences, histories (e.g., shopping histories, etc.), current contents of a user's virtual cart, and/or the like. The sensor data 128, meanwhile, may comprise image data, weight data, and/or any other type of sensor data described in detail below. The hypothesis-generator service 130 may comprise one or more neural networks, classifier, or the like for analyzing the sensor data 128, potentially along with other information such as user profile information, historical data, or the like, to determine a result of an event represented by the sensor data 128.

In this example, the first hypothesis source 116 may determine that a particular identified user 106 picked a particular item 108. In addition, the first hypothesis source 116 may calculate a confidence value indicating a likelihood that the determined result is accurate—that is, corresponds to the real-world event that occurred within the environment 102. In some instances, the system 104 may compare this confidence value to a first threshold confidence value. If the system 104 determines that the calculated confidence value is greater than the first threshold level, then the system may store the result determined by the first hypothesis source 116 as the final result. For instance, the system 104 may deem the result "high-confidence" and may correspondingly update a virtual cart associated with the user 106.

If, however, the calculated confidence value is less than the first threshold confidence threshold, then the system may deem the determined result as "low-confidence." In addition, the system 104 may use a trained model to determine whether to re-designate the result as high-confidence or whether to request that one or more additional hypothesis sources verify or otherwise determine a result of the event. To do so, the system may route information regarding the event (e.g., the sensor data, the result determined by the first hypothesis service 116, etc.) to the HAP service 118.

As illustrated, the HAP service 118 may include one or more processors 132 and one or more computer-readable media 134, which stores a trained model 136 and a feature-extraction component 138. The trained model 136 may comprise a neural network, a random-forest model, or any other type of model that has been trained to classify data. For example, the model 136 may have been trained using supervised learning to determine a degree to which the second hypothesis service 120 (and/or one or more other hypothesis services) would determine the same result as the first hypothesis service 116 for any given event. To train the model, the system 104 may have input data into the model along with corresponding ground-truth labels. For example, the system 104 may have had the first hypothesis source 116 determine the results of a large number of different events based on respective sets of sensor data. The system 104 may then have routed each of these results to the second hypothesis service 120 for determining, for each event, whether the second hypothesis source 120 agreed with the result of the event of as determined by the first hypothesis source 116. In some instances, more than one event may be combined into a merged event. For example, if one event is deemed low-confidence, then the system may identify if there are any events that occurred within a predefined time and/or location of the low-confidence event. For example, the system may identify any events that occurred, at least in part, within five seconds of the low-confidence event and on a same shelf or other inventory location as the low-confidence event. These events, along with the low-confidence event, may then be combined into a merged event. Sensor data (e.g., video data, weight-sensor data, etc.) associated with this merged event may then be sent to the second hypothesis source 120 for analysis. For example, a time range of the merged event may be determined as a beginning time of the first event of the merged event to an end time of a last event of the merged event, and sensor data corresponding to this time range may be sent to the second hypothesis source 120. The second hypothesis source 120 may then output a net result of the merged event, which may be used to determine whether the second hypothesis source 120 determined the same result for the low-confidence event.

For instance, envision that a merged event comprises a first, high-confidence event and a second, low-confidence event. For example the first hypothesis source 116 may have determined a first result of the first event indicating that a user picked up a bottle of ketchup and a second result of the second event indicating that the user returned the bottle of ketchup (albeit with a low confidence). Therefore, if the second hypothesis source 120 determines a net result of the merged event as "no items picked or returned", then the system may determine that the second hypothesis source 120 has agreed with the low-confidence result determined by the second hypothesis source 120, given that the first hypothesis source 116 came to the same net conclusion (one pick of a ketchup bottle and one return of a ketchup bottle, resulting in no picks or returns over those two events). If, however, the second hypothesis source 120 returns a different net result, then the system may determine that the second hypothesis source 120 did not agree with the first hypothesis source 116. The model may then be trained on these agreements and disagreements. Further, while the above example describes determining agreement based on net results of merged events output by the second hypothesis source 120, in other instances the second hypothesis source 120 may analyze low-confidence events individually.

In addition, in some instances the system may input, into the model during training, historical data that indicates, for example, the history of user interactions with a particular item, the history of user interactions with a particular shelf (or other inventory location), the history of a particular user's interactions, the history of interactions at a particular environment (e.g., the environment 102), the history of interactions at a particular time-of-day, day-of-the-week, season-of-the-year, and/or the like. Using this information, the system 104 generates the trained model 136 configured to receive information indicating results as determined by the first hypothesis source 116 and calculate a likelihood that the second hypothesis source 120 would agree with each of these results.

When the first hypothesis source 116 determines a low-confidence result associated with an event, the system 104 may route information indicative of this determination to the HAP service 118. The feature-extraction component 138 may extract one or more features from the information for inputting into the trained model 136. For example, the feature-extraction component 138 may extract features of the sensor data (e.g., time of day, location of event, etc.), potentially in addition to historical data, such as historical data associated with the shelf, user, environment, and/or any other information described above. For each event, the HAP service 118 may input this information into the trained classifier 136, which may output a value (e.g., a numerical value) indicating a likelihood that the second hypothesis source 120 would agree with the result of the event as determined by the first hypothesis source 116.

After the trained classifier 136 outputs this value, the system 104 may compare the value to a second threshold value. In some instances, the second threshold value may corresponding to a strong likelihood that, according to the trained classifier, the second hypothesis source 120 would agree with the result determined by the first hypothesis source 116 (e.g., 60% probability, 80% probability, 99% probability, etc.). In response to determining that the value is greater than the second threshold value, the system may promote the designation of the event from low-confidence to high-confidence. That is, given that the trained classifier 136 determines that it is very likely that the second hypothesis source 120 will agree with the low-confidence result, the system 104 may save the resource cost of the second hypothesis service and may instead promote the designation of the result to high-confidence as would occur upon receiving an agreement directly from the second hypothesis source 120.

In addition to using the trained classifier 136 to bypass use of the second hypothesis source 120, the system 104 may use the output of the trained classifier 136 to determine an amount of the second hypothesis source 120 and/or a number of additional hypothesis sources to employ to determine a high-confidence result of an event. For example, if the value output from the trained classifier 136 is greater than a third threshold value (that is lower than the second threshold value) then the system 104 may use fewer resources than if the value is less than both the second and third thresholds. For instance, if the value is greater than the third threshold, the system 104 may route at least a portion of the second data to the second hypothesis source 120 for determining a result of the event. In some instances, the second hypothesis source comprises an associate service in which one or more human associates use respective computing devices to consume the sensor data and determine a result of the event. In other instances, the second hypothesis source 120 comprises a different neural network, algorithm, or the like than the first hypothesis source 120. In still other instances, the second hypothesis source 120 analyzes sensor data from different sensors than the sensor data analyzed by the first hypothesis source. For example, the first hypothesis source 116 may analyze sensor data acquired by imaging sensors, while the second hypothesis source 120 may analyze sensor data acquired by load cells (potentially along with sensor data acquired by the imaging sensors).

In some instances, the second hypothesis source 120 comprises the one or more human users of the associate service that consume the received sensor data (denoted as "inquiry data") to determine a result of the event. If the trained classifier 136 output the value by that was less than the second threshold but greater than the third threshold, then the system may route the inquiry data to a first number of computing devices operated by the human users. For instance, in these instances the system 104 may route the inquiry data to a single computing device for analysis by a single human associate. If the human associate returns, via the computing device, an indication of a result corresponds to the result determined by the first hypothesis source 116, then the system may promote the result from low-confidence to high-confidence. In response to this promotion, the system 104 may update a virtual cart of the identifier user to correspond to the determined result of the event.

If, however, the human associate indicates a different result, or if the value output by the trained classifier 136 is less than the third threshold, then the system 104 may employ a second, greater number of instances of the second hypothesis source 120. For example, the system 104 may route sensor data to a total of three computing devices operable by respective human associates. Each of these human associates may indicate, via a corresponding computing device, a result of the event and if a particular result is indicated in a majority of associate responses, then the system 104 may store this result as a high-confidence result. If not, however, then the system 104 may escalate inquiry of the event to another human associate, a different hypothesis service, and/or the like.

In some instances, an event that occurs within the environment 102 may be related to other events, and this relationship may affect analysis of the event. For example, in response to the first hypothesis source 116 identifying a low-confidence result, the system 104 may identify any events that occur with a predefined time range around the event associated with the low-confidence result. In some instances, the predefined time range is prior to the event, after the event, or both before and after the event (e.g., five seconds before or after, one minute before or after, etc.). The system 104 may generate a merged event that corresponds to each event within this time range (including the event associated with the low-confidence result). In these instances, the entire merged event may be subject to the process of the low-confidence event described above.

To provide an example, envision a merged event that comprises an event associated with a low-confidence result and an event associated with a high-confidence result. The system 104 may employ the HAP service 118 to determine a likelihood that the second hypothesis source 120 would agree with the low-confidence result determined by the first hypothesis source 116. Again, if the trained classifier 136 indicates that the likelihood is greater than a relatively high threshold, the low-confidence result may be designated as high-confidence. Thus, both events in the merged events may be associated with a high-confidence result and these results may be stored (without analysis by the second hypothesis source 120). If, however, the trained classifier 136 outputs a likelihood that is not above the relatively-high threshold, then sensor data associated with both the low-confidence event and the high-confidence event may be sent to the second hypothesis service 120 for reanalysis. Stated otherwise, each event within a merged event may be reanalyzed by the second hypothesis source 120 unless and until each event within the merged event is associated with a high-confidence result.

Figure 2:
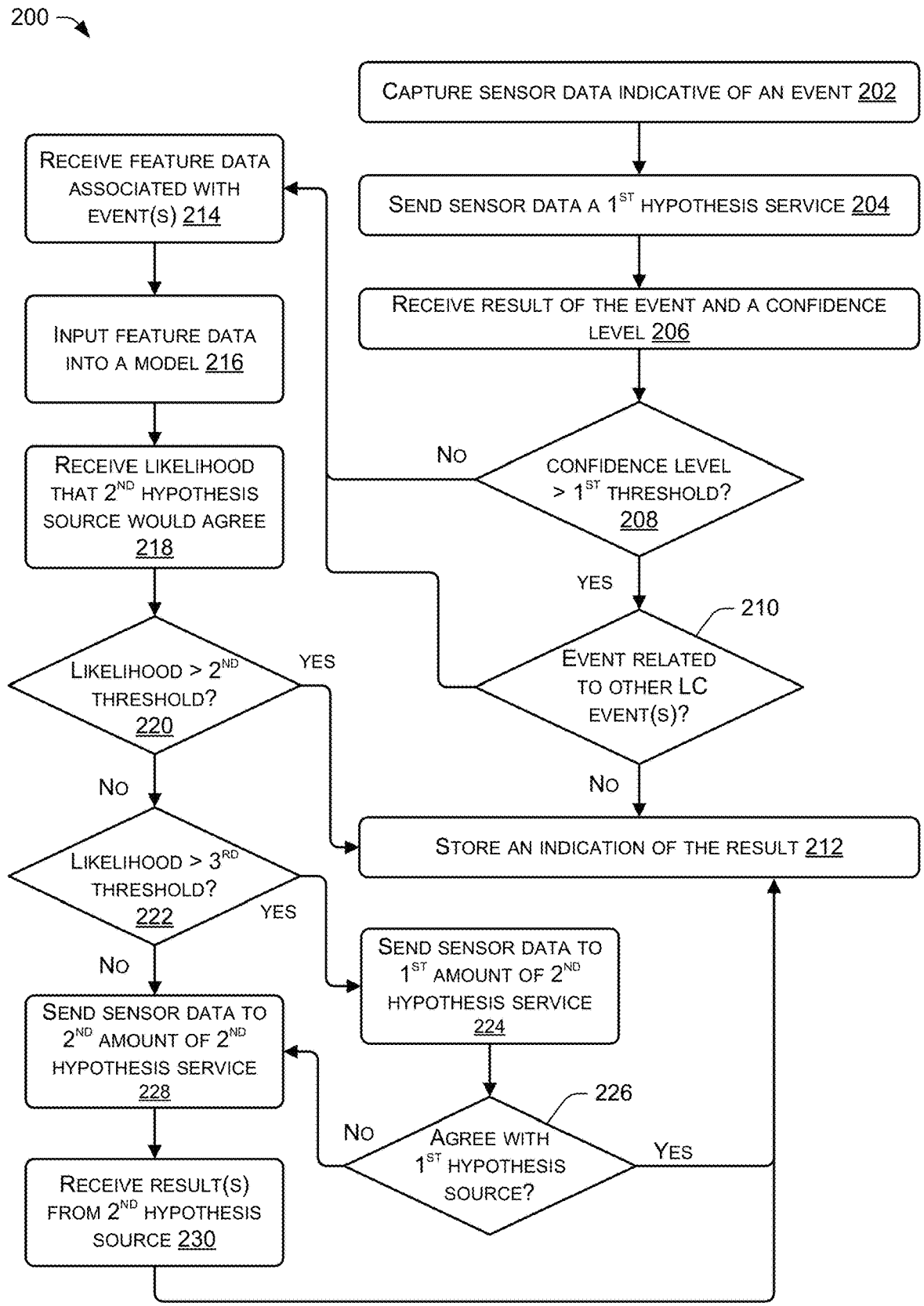
FIG. 2 illustrates a flow diagram of an example process for generating, by a first hypothesis source, a first result of an event using sensor data, determining a likelihood that a second hypothesis source would determine the same result, and determining whether to enlist the second hypothesis service to make this determination.

FIG. 2 illustrates a flow diagram of an example process 200 for generating, by a first hypothesis source, a first result of an event using sensor data, determining a likelihood that a second hypothesis source would determine the same result, and determining whether to enlist the second hypothesis service to make this determination. The processes discussed herein may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. In addition, the order in which the operations are described is not intended to be construed as a limitation. Finally, while the system 104 of FIG. 1 may perform some or all of the described operation, in other instances one or more other entities may additionally or alternatively perform some or all of the operation.

The process 200 includes, at an operation 202, capturing sensor data within an environment, with the sensor data being indicative of at least one event. As describe below, an array of sensors may capture this data, such as imaging sensors, load cells, touch sensors, RFID readers, light sensors, and/or the like. In some instances, the sensor data includes at least image data captured by one or more imaging sensors positioned within an environment.

At an operation 202, the process 200 includes sending the sensor data, or information for acquiring the sensor data, to a first hypothesis service. For instance, the sensor data may be routed directly to the first hypothesis service, or an address at which the sensor data is stored may be sent to the first hypothesis service to allow the service to retrieve the data. In some instances, the first hypothesis service comprises a neural network, classifier, or other technology configured to analyze the sensor data to identify the event and determine the result, while in other instances the first hypothesis service may comprise one or more human associates configured to analyze the sensor data.

In either instance, at an operation 206 the process 200 receives a result associated with the event and a corresponding confidence value indicating an accuracy of the result. The result may comprise, for example, an identity of a user that interacted with an item, an identity of the item, an action performed with respect to the item (e.g., a pick, a return, etc.), a location of the action, a time of the action, and/or other information.

At an operation 208, the process 200 determines whether the confidence value is greater than a first threshold level. In some instances, the first threshold level is set relatively high, indicating a degree of certainty that the determined result corresponds to the real-world event that took place (e.g., that a particular user picked a particular item). If the confidence value is greater than this threshold, then the result may be designated as high-confidence and, at an operation 210, the process 200 may query whether the high-confidence event is related to any low-confidence events (e.g., events associated with a result having respective confidence values that are below the first threshold). For instance, the operation 210 may include determining whether the high-confidence event is nonetheless a portion of a merged event that includes one or more low-confidence events. As described above, a high-confidence event may be associated with such a merged event if this event takes place within a specified time range and/or location (e.g., on the same shelf) as an event having a low-confidence result.

If, however, the high-confidence event is not associated with a low-confidence event, then at an operation 212 the process 200 may store the result associated with the event. For instance, an inventory management system may update a virtual cart of one or more users to reflect the determined result of the event (e.g., may add an instance of a picked item to the identified user's virtual cart).

Meanwhile, in instances where the event is related to a low-confidence event or the confidence value of the event is not greater than the first threshold (and, thus, is designated as a low-confidence event), then the process may continue to an operation 214. Here, the process 200 may receive feature data associated with the event. For example, the operation 214 may include extracting feature data from the sensor data associated with the event, potentially along with related historical data, such as a history of a user marked as candidate user for the event, a history of an item associated with the event, a history of a shelf or other location associated with the event, a history of the particular environment (e.g., store) at which the event occurred, and/or the like.

At an operation 216, the process 200 inputs this feature data into a trained model, such as a trained convolutional neural network, configured to output a likelihood that a second hypothesis source would agree with the result determined by the first hypothesis source. At an operation 218, the process 200 receives information (e.g., a numerical value) indicating a likelihood that the hypothesis source would agree with the result determined by the first hypothesis source. In some instances, the trained model inputs the feature data into a convolutional neural network and outputs a numerical score between zero and one indicating this likelihood.

At an operation 220, the process 200 determines whether this likelihood is greater than a second threshold. For example, the second threshold at a value indicating there is high degree of likelihood that the second hypothesis source would agree with the first source (e.g., an 80% likelihood, a 95% likelihood, a 99% likelihood, etc.). If the likelihood is in fact greater than second threshold value, then the process 200 may proceed to storing an indication of the result at the operation 212. That is, the process 200 may promote the result from a low-confidence event to a high-confidence event, causing the result to be correspondingly stored.

In some instances, however, the system may allow some number of events to be analyzed by the second hypothesis source, regardless of whether the model indicates, or would indicate if applied to the data, that the second hypothesis source is likely to agree with the first hypothesis source. That is, the system may allow some percentage of low-confidence events (e.g., 1%, 10%, etc.) to be analyzed by the second hypothesis source and may thereafter use the results determined by the second hypothesis source to re-train the model. By allowing some data to be analyzed by the second hypothesis source, the system avoids drift between results determined by the model and real-world results.

If, however, the likelihood is not greater than the second threshold value, then at an operation 222 the process 20 may determine whether the likelihood is greater than a third threshold value that is less than the second threshold value. For example, results that are less than the second threshold value but greater than the third value may indicate that there is between a 50% and 95% likelihood that the second hypothesis source would agree with the first hypothesis source. Of course, while one example range has been provided, it is to be appreciated that other ranges may be used.

If the likelihood is in fact greater than the third threshold, then at an operation 224 the process 200 sends the sensor data to a first amount (e.g., a first number of computing devices, a first number of human associates, etc.) of the second hypothesis service. In some instance, this comprises sending inquiry data (including at least a portion of the sensor data captured near the occurrence of the event) to one or more computing devices associated with one or more human users. In some instances, the sensor data is sent to for analysis by a single human associate.

At an operation 226, the process 200 determines whether all, a majority, some, or any other number of the amount of the second hypothesis source in fact agree with the result determined by the first hypothesis source. For instance, in the example of sending the sensor data to the single human associate, the operation 226 may determine whether that human associate agreed with the result determined by the first hypothesis source. If so, then the process 200 proceeds to the indication store the result. That is, the result is promoted from low-confidence to high-confidence.

If, however, the operation 226 decides that there is no agreement (in whole or in part) between the first and second hypothesis source, then the process 200 proceeds to an operation 228. Here, the process 200 sends the sensor data to a second amount of the second hypothesis source. For example, the process 200 may send the sensor data to a three or more human associates for analysis.

At an operation 230, the process 200 receives the results of the event as determined by the second hypothesis source. For instance, the process 20 may receive an indication from each computing device of each human associate regarding what they believe occurred during the event. In some instances, if a majority of the human associates agree, then that result may be deemed a high-confidence result to associate with the event. The process 20 then process to store the result in association with the event at the operation 212.

Figure 3:
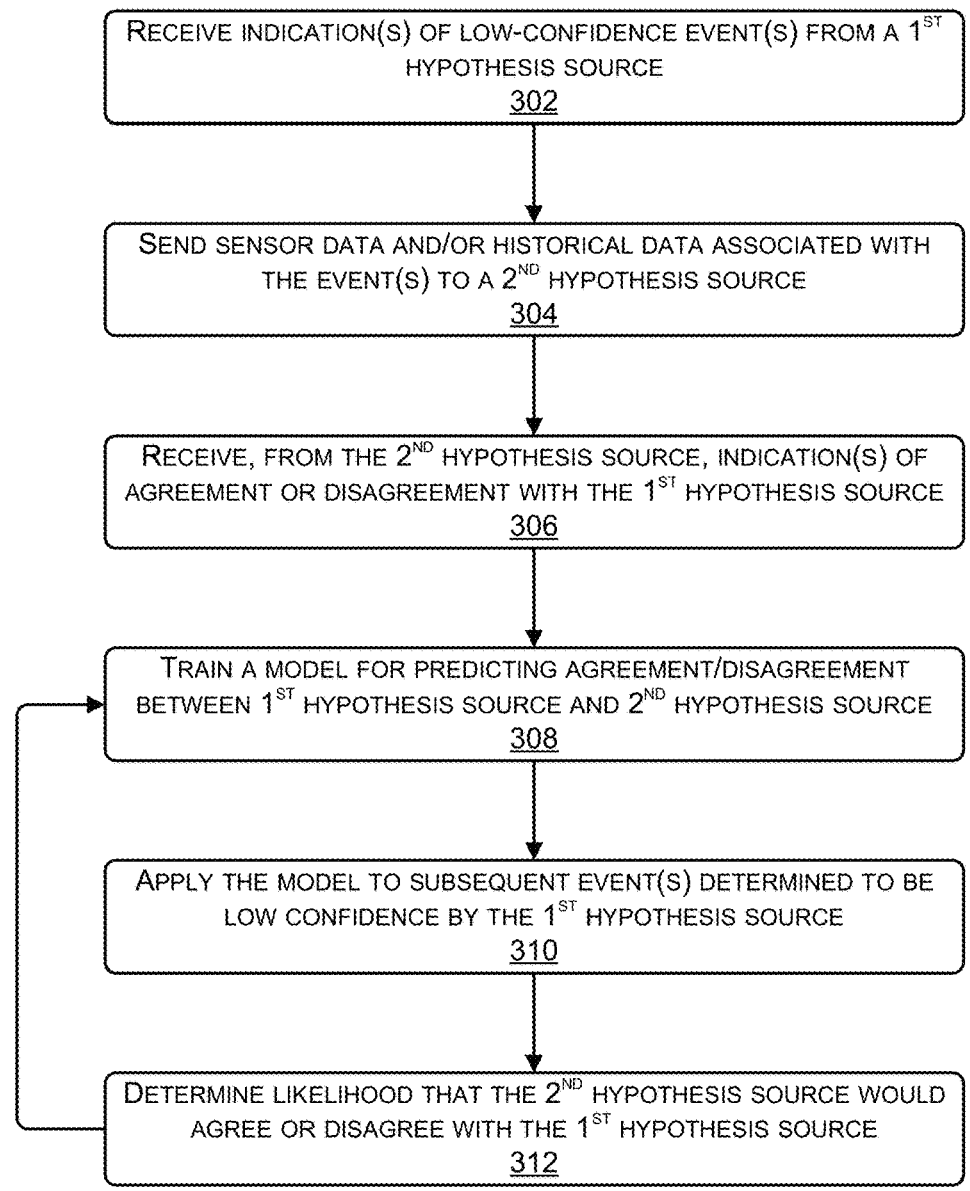
FIG. 3 illustrates a flow diagram of an example process for training a model that the HAP service of FIG. 1 may use to determine likelihoods that a second and/or subsequent hypothesis sources would determine the same result of respective events as a first hypothesis source.

FIG. 3 illustrates a flow diagram of an example process 300 for training the model 136 that the HAP service 118 may use to determine likelihoods that a second and/or subsequent hypothesis sources would determine the same result of respective events as a first hypothesis source. At an operation 302, the process 300 includes receiving indications of low-confidence events from a first hypothesis source. That is, a neural network, Bayesian classifier, random-forest model, or other model already trained to determine results of events and assign confidence values to the results may provide information associated with events having confidence values less than a threshold.

At an operation 304, the process 300 includes sending sensor data associated with the events and/or historical data related to these events to a second hypothesis source. As described above, the second hypothesis source may comprise one or more human associates, one or more computing devices configured to analyze the information using algorithmic techniques, and/or the like. In each instance, the second hypothesis source may be configured to output an indication of whether the second hypothesis source agrees or disagrees with the low-confidence result determined by the first hypothesis source. At an operation 306, the process 300 receives, from the second hypothesis source, these respective indications of agreement or disagreement with the results determined by the first hypothesis source.

The process 300 may there, at an operation 308, train a model using the information received at operations 302 and 306 such that the model is configured to predict agreement or disagreement between the second hypothesis source and the first hypothesis source for low-confidence results determined by the first hypothesis source. That is, the operation 308 may include using supervised learning train the model by inputting, into the model, the information associated with the low-confidence training results, with this result training data each being labeled as either having been agreed to or disagreed to by second hypothesis source.

At an operation 310, the process 300 includes applying the now-trained model to a subsequent low-confidence result having been determined by the first hypothesis source. That is, the system 104 may insert information associated with this low-confidence result into the trained model. At an operation 312, the trained model may then output an indication of a likelihood that the second hypothesis source would agree with the low-confidence result and, thus, this indication may be received by the system 104. In addition, the process 300 may use this result back at the operation 308, such that the trained model is continually or periodically retrained over time. In addition, or in the alternative, the process 300 may continue to allow some low-confidence events to be analyzed by the second hypothesis source, without reference to whether the model predicts agreement, and may use these results to continually retrain the model. As described above, this may avoid drift of the model over time. In sum, while the process 300 illustrates continually or periodically training the model using data labeled by the model itself, in some instances the process 300 may additionally or alternatively perform this training using labeled data generated by the second hypothesis source.

Figure 4:
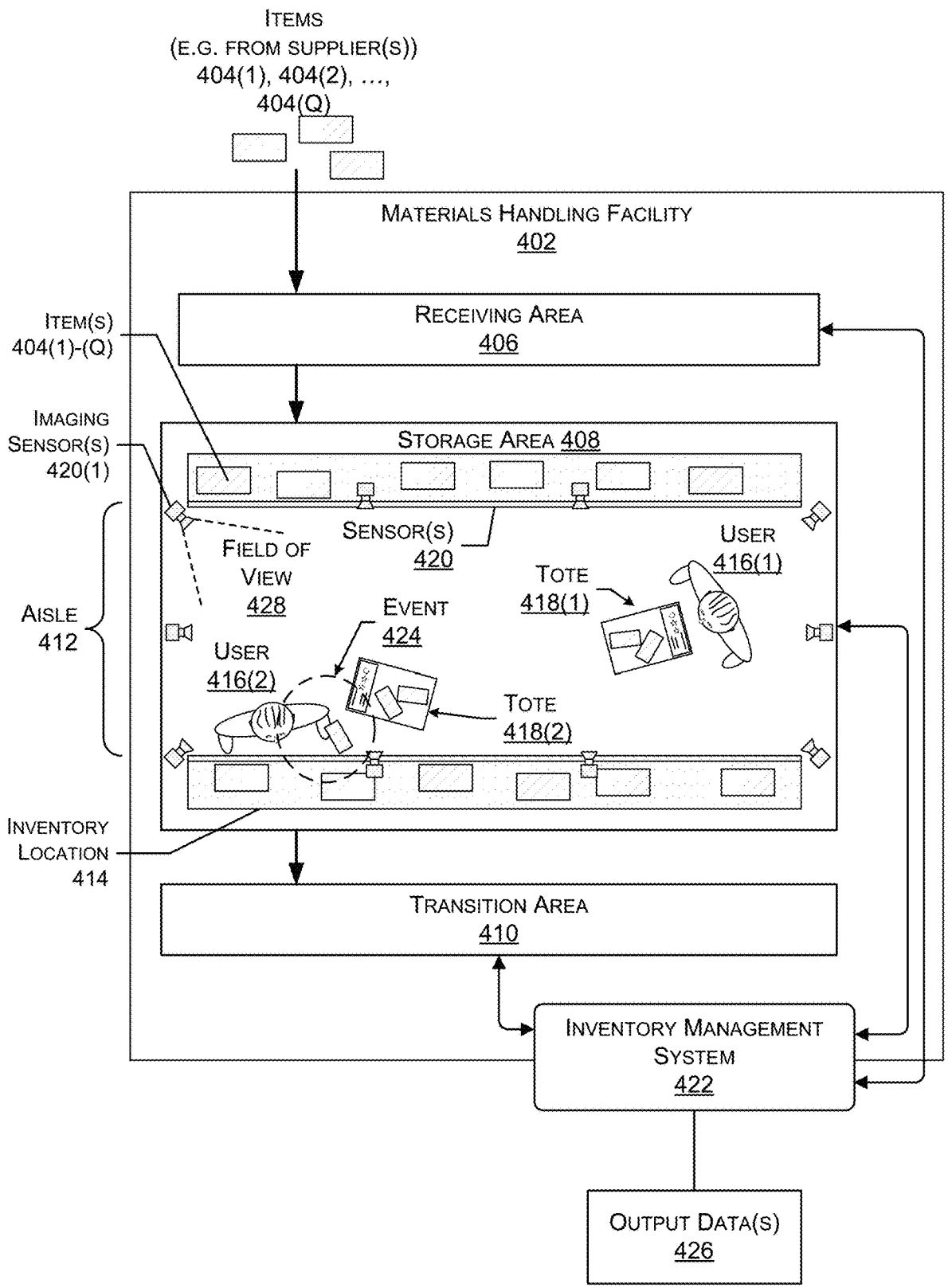
FIG. 4 is a block diagram of a materials handling facility that includes sensors and an inventory management system configured to generate output regarding events occurring in the facility using the sensor data. The events may include, for example, a user picking an item or returning an item. In some instances, the inventor management system maintains a state of virtual shopping cart of each user in the facility using the sensor data.

An implementation of a materials handling system 100 configured to store and manage inventory items is illustrated in FIG. 4. A materials handling facility 402 (facility) comprises one or more physical structures or areas within which one or more items 404(1), 404(2), . . . , 404(Q) (generally denoted as items 404) may be held. As used in this disclosure, letters in parenthesis such as "(Q)" indicate an integer result. The items 404 comprise physical goods, such as books, pharmaceuticals, repair parts, electronic gear, groceries, and so forth.

The facility 402 may include one or more areas designated for different functions with regard to inventory handling. In this illustration, the facility 402 includes a receiving area 406, a storage area 408, and a transition area 410. The receiving area 406 may be configured to accept items 404, such as from suppliers, for intake into the facility 402. For example, the receiving area 406 may include a loading dock at which trucks or other freight conveyances unload the items 404.

The storage area 408 is configured to store the items 404. The storage area 408 may be arranged in various physical configurations. In one implementation, the storage area 408 may include one or more aisles 412. The aisle 412 may be configured with, or defined by, inventory locations 414 on one or both sides of the aisle 412. The inventory locations 414 may include one or more of shelves, racks, cases, cabinets, bins, floor locations, or other suitable storage mechanisms for holding or storing the items 404. The inventory locations 414 may be affixed to the floor or another portion of the facility's structure, or may be movable such that the arrangements of aisles 412 may be reconfigurable. In some implementations, the inventory locations 414 may be configured to move independently of an outside operator. For example, the inventory locations 414 may comprise a rack with a power source and a motor, operable by a computing device to allow the rack to move from one location within the facility 402 to another.

One or more users 416(1), 416(2), . . . , 416(U) (generally denoted as users 416), totes 418(1), 418(2), . . . , 418(T) (generally denoted as totes 418) or other material handling apparatus may move within the facility 402. For example, the users 416 may move about within the facility 402 to pick or place the items 404 in various inventory locations 414, placing them on the totes 418 for ease of transport. An individual tote 418 is configured to carry or otherwise transport one or more items 404. For example, a tote 418 may include a basket, a cart, a bag, and so forth. In other implementations, other agencies such as robots, forklifts, cranes, aerial drones, and so forth, may move about the facility 402 picking, placing, or otherwise moving the items 404.

One or more sensors 420 may be configured to acquire information in the facility 402. The sensors 420 may include, but are not limited to, imaging sensors 420(1), weight sensors, radio frequency (RF) receivers, temperature sensors, humidity sensors, vibration sensors, and so forth. The sensors 420 may be stationary or mobile, relative to the facility 402. For example, the inventory locations 414 may contain cameras 420(1) configured to acquire images of pick or placement of items 404 on shelves, of the users 416(1) and 416(2) in the facility 402, and so forth. In another example, the floor of the facility 402 may include weight sensors configured to determine a weight of the users 416 or other object thereupon. The sensors 420 are discussed in more detail below with regard to FIG. 5.

During operation of the facility 402, the sensors 420 may be configured to provide information suitable for tracking how objects move or other occurrences within the facility 402. For example, a series of images acquired by a imaging sensor 420(1) may indicate removal of an item 404 from a particular inventory location 414 by one of the users 416 and placement of the item 404 on or at least partially within one of the totes 418.

While the storage area 408 is depicted as having one or more aisles 412, inventory locations 414 storing the items 404, sensors 420, and so forth, it is understood that the receiving area 406, the transition area 410, or other areas of the facility 402 may be similarly equipped. Furthermore, the arrangement of the various areas within the facility 402 is depicted functionally rather than schematically. For example, multiple different receiving areas 406, storage areas 408, and transition areas 410 may be interspersed rather than segregated in the facility 402.

The facility 402 may include, or be coupled to, an inventory management system 422, which form a portion of the system 104 described above with reference to FIG. 1. The inventory management system 422 is configured to identify interactions with and between users 416, devices such as sensors 420, robots, material handling equipment, computing devices, and so forth, in one or more of the receiving area 406, the storage area 408, or the transition area 410. These interactions may include one or more events 424. For example, events 424 may include the entry of the user 416 to the facility 402, stocking of items 404 at an inventory location 414, picking of an item 404 from an inventory location 414, returning of an item 404 to an inventory location 414, placement of an item 404 within a tote 418, movement of users 416 relative to one another, gestures by the users 416, and so forth. Other events 424 involving users 416 may include the user 416 providing authentication information in the facility 402, using a computing device at the facility 402 to authenticate identity to the inventory management system 422, and so forth. Some events 424 may involve one or more other objects within the facility 402. For example, the event 424 may comprise movement within the facility 402 of an inventory location 414, such as a counter mounted on wheels. Events 424 may involve one or more of the sensors 420. For example, a change in operation of a sensor 420, such as a sensor failure, change in alignment, and so forth, may be designated as an event 424. Continuing the example, movement of an imaging sensor 420(1) resulting in a change in the orientation of the field of view 428 (such as resulting from someone or something bumping the imaging sensor 420(1)) may be designated as an event 424.

By determining the occurrence of one or more of the events 424, the inventory management system 422 may generate output data 426. The output data 426 comprises information about the event 424. For example, where the event 424 comprises an item 404 being removed from an inventory location 414, the output data 426 may comprise an item identifier indicative of the particular item 404 that was removed from the inventory location 414 and a user identifier of a user that removed the item.

The inventory management system 422 may use one or more automated systems to generate the output data 426. For example, an artificial neural network, one or more classifiers, or other automated machine learning techniques may be used to process the sensor data from the one or more sensors 420 to generate output data 426. The automated systems may operate using probabilistic or non-probabilistic techniques. For example, the automated systems may use a Bayesian network. In another example, the automated systems may use support vector machines to generate the output data 426 or the tentative results. The automated systems may generate confidence value data that provides information indicative of the accuracy or confidence that the output data 426 or the tentative data corresponds to the physical world. As described above and below, this confidence value may be used by the HAP service 118 to determine whether and/or how to utilize a second hypothesis source.

The confidence value data may be generated using a variety of techniques, based at least in part on the type of automated system in use. For example, a probabilistic system using a Bayesian network may use a probability assigned to the output as the confidence value. Continuing the example, the Bayesian network may indicate that the probability that the item depicted in the image data corresponds to an item previously stored in memory is 95%. This probability may be used as the confidence value for that item as depicted in the image data.

In another example, output from non-probabilistic techniques such as support vector machines may have confidence values based on a distance in a mathematical space within which the image data of the item and the images of previously stored items have been classified. The greater the distance in this space from a reference point such as the previously stored image to the image data acquired during the occurrence, the lower the confidence value.

In yet another example, the image data of an object such as an item 404, user 416, and so forth, may be compared with a set of previously stored images. Differences between the image data and the previously stored images may be assessed. For example, differences in shape, color, relative proportions between features in the images, and so forth. The differences may be expressed in terms of distance with a mathematical space. For example, the color of the object as depicted in the image data and the color of the object as depicted in the previously stored images may be represented as coordinates within a color space.

The confidence value may be determined based at least in part on these differences. For example, the user 416 may pick an item 404(1) such as a perfume bottle that is generally cubical in shape from the inventory location 414. Other items 404 at nearby inventory locations 414 may be predominately spherical. Based on the difference in shape (cube vs. sphere) from the adjacent items, and the correspondence in shape with the previously stored image of the perfume bottle item 404(1) (cubical and cubical), the confidence value that the user 114 has picked up the perfume bottle item 404(1) is high.

In some situations, the automated techniques may be unable to generate output data 426 with a confidence value above a threshold result. For example, the automated techniques may be unable to distinguish which user 416 in a crowd of users 416 has picked up the item 404 from the inventory location 414. In other situations, it may be desirable to provide human confirmation of the event 424 or of the accuracy of the output data 426. For example, some items 404 may be deemed age restricted such that they are to be handled only by users 416 above a minimum age threshold.

In instances where human confirmation is desired, sensor data associated with an event 424 may be processed to generate inquiry data. The inquiry data may include a subset of the sensor data associated with the event 424. The inquiry data may also include one or more of one or more tentative results as determined by the automated techniques, or supplemental data. The subset of the sensor data may be determined using information about the one or more sensors 420. For example, camera data such as the location of the imaging sensor 420(1) within the facility 402, the orientation of the imaging sensor 420(1), and a field of view 428 of the imaging sensor 420(1) may be used to determine if a particular location within the facility 402 is within the field of view 428. The subset of the sensor data may include images that may show the inventory location 414 or that the item 404 was stowed. The subset of the sensor data may also omit images from other imaging sensors 420(1) that did not have that inventory location 414 in the field of view 428. The field of view 428 may comprise a portion of the scene in the facility 402 that the sensor 420 is able to generate sensor data about.

Continuing the example, the subset of the sensor data may comprise a video clip acquired by one or more imaging sensors 420(1) having a field of view 428 that includes the item 404. The tentative results may comprise the "best guess" as to which items 404 may have been involved in the event 424. For example, the tentative results may comprise results determined by the automated system that have a confidence value above a minimum threshold.

Furthermore, when a result of an event record is determined to be below a threshold confidence result, prior to sending the sensor data associated with the event 424 to the human associate, the inventor management system 422 may determine whether the record of the event 424 is to be merged with any other event records. If so, the inventor management system 422 may store an indication of the merged event and may send the user interface comprising inquiry data (e.g., a video clip, etc.) associated with the entire merged event to the computing device of the human associate.

In some instances, the user interface may also include supplemental data, such as the weight of the item 404, bounding boxes or other visual cues to overlay or that have been inserted into the video clip for presentation, and so forth. The inquiry data is provided to a device associated with an associate. For example, the device may comprise a tablet computer, laptop computer, personal computer, set-top box, and so forth. The device presents an associate user interface based at least in part on the inquiry data. Continuing the example, the associate user interface may present the video clip of the item 404 being removed from the inventory location 414. One or more of the tentative results associated with the identity of the item 404 may also be presented in the associate user interface. The associate may view the video clip and the supplemental data and make a selection from the tentative results to identify the item 404 was removed from the inventory location 414. The selection or other information generated by the associate comprises response data. The response data from one or more associates may be processed to generate the output data 426. For example, the majority of the associates may identify the item 404 that was picked from the inventory location 414 as "5 oz box powdered toast". Based at least in part on the majority selection, the inventory management system 422 may generate output data 426 indicating that the item 404 picked was "5 oz box powdered toast".

The facility 402 may be configured to receive different kinds of items 404 from various suppliers and to store them until a customer orders or retrieves one or more of the items 404. A general flow of items 404 through the facility 402 is indicated by the arrows of FIG. 4. Specifically, as illustrated in this example, items 404 may be received from one or more suppliers, such as manufacturers, distributors, wholesalers, and so forth, at the receiving area 406. In various implementations, the items 404 may include merchandise, commodities, perishables, or any suitable type of item 404, depending on the nature of the enterprise that operates the facility 402. The receiving of the items 404 may comprise one or more events 424 for which the inventory management system 422 may generate output data 426.

Upon being received from a supplier at receiving area 406, the items 404 may be prepared for storage. For example, items 404 may be unpacked or otherwise rearranged. The inventory management system 422 may include one or more software applications executing on a computer system to provide inventory management functions based on the events 424 associated with the unpacking or rearrangement. These inventory management functions may include maintaining information indicative of the type, quantity, condition, cost, location, weight, or any other suitable parameters with respect to the items 404. The items 404 may be stocked, managed, or dispensed in terms of countable, individual units or multiples, such as packages, cartons, crates, pallets, or other suitable aggregations. Alternatively, some items 404, such as bulk products, commodities, and so forth, may be stored in continuous or arbitrarily divisible amounts that may not be inherently organized into countable units. Such items 404 may be managed in terms of measurable quantity such as units of length, area, volume, weight, time, duration, or other dimensional properties characterized by units of measurement. Generally speaking, a quantity of an item 404 may refer to either a countable number of individual or aggregate units of an item 404 or a measurable amount of an item 404, as appropriate.

After arriving through the receiving area 406, items 404 may be stored within the storage area 408. In some implementations, like items 404 may be stored or displayed together in the inventory locations 414 such as in bins, on shelves, hanging from pegboards, and so forth. In this implementation, all items 404 of a given kind are stored in one inventory location 414. In other implementations, like items 404 may be stored in different inventory locations 414. For example, to optimize retrieval of certain items 404 having frequent turnover within a large physical facility 402, those items 404 may be stored in several different inventory locations 414 to reduce congestion that might occur at a single inventory location 414. Storage of the items 404 and their respective inventory locations 414 may comprise one or more events 424.

When a customer order specifying one or more items 404 is received, or as a user 416 progresses through the facility 402, the corresponding items 404 may be selected or "picked" from the inventory locations 414 containing those items 404. In various implementations, item picking may range from manual to completely automated picking. For example, in one implementation, a user 416 may have a list of items 404 they desire and may progress through the facility 402 picking items 404 from inventory locations 414 within the storage area 408, and placing those items 404 into a tote 418. In other implementations, employees of the facility 402 may pick items 404 using written or electronic pick lists derived from customer orders. These picked items 404 may be placed into the tote 418 as the employee progresses through the facility 402. Picking may comprise one or more events 424, such as the user 416 in moving to the inventory location 414, retrieval of the item 404 from the inventory location 414, and so forth.

After items 404 have been picked, they may be processed at a transition area 410. The transition area 410 may be any designated area within the facility 402 where items 404 are transitioned from one location to another or from one entity to another. For example, the transition area 410 may be a packing station within the facility 402. When the item 404 arrives at the transition area 410, the items 404 may be transitioned from the storage area 408 to the packing station. The transitioning may comprise one or more events 424. Information about the transition may be maintained by the inventory management system 422 using the output data 426 associated with those events 424.

In another example, if the items 404 are departing the facility 402 a list of the items 404 may be obtained and used by the inventory management system 422 to transition responsibility for, or custody of, the items 404 from the facility 402 to another entity. For example, a carrier may accept the items 404 for transport with that carrier accepting responsibility for the items 404 indicated in the list. In another example, a customer may purchase or rent the items 404 and remove the items 404 from the facility 402. The purchase or rental may comprise one or more events 424.

During use of the facility 402, the user 416 may move about the facility 402 to perform various tasks, such as picking or placing the items 404 in the inventory locations 414. Pluralities of users 416 may move past one another, travel in groups, may coalesce into groups, groups may break apart, and so forth. These movements may comprise one or more events 424. For example, an event 424 may comprise a plurality of users 416 moving past one another in the aisle 412.

The inventory management system 422 may access or generate sensor data about the facility 402 and the contents therein including the items 404, the users 416, the totes 418, and so forth. The sensor data may be acquired by one or more of the sensors 420, data provided by other systems, and so forth. For example, the sensors 420 may include cameras 420(1) configured to acquire image data of scenes in the facility 402. The image data may comprise still images, video, or a combination thereof. The image data may be processed by the inventory management system 422 to determine a location of the user 416, the tote 418, the identity of the user 416, and so forth. As used herein, the identity of the user may represent a unique identifier of the user (e.g., name, number associated with user, username, etc.), an identifier that distinguishes the user amongst other users being tracked with the environment, or the like. The sensors 420 are discussed in more detail below with regard to FIG. 5.

The inventory management system 422, or systems coupled thereto, may be configured to identify the user 416, as well as to determine other candidate users. In one implementation, this determination may comprise comparing sensor data with previously stored identity data. For example, the user 416 may be identified by showing their face to a facial recognition system, by presenting a token carrying authentication credentials, providing a fingerprint, scanning a barcode or other type of unique identifier upon entering the facility, and so forth. Identity of the user 416 may be determined before, during, or after entry to the facility 402. Determination of the user's 116 identity may comprise comparing sensor data associated with the user 416 in the facility 402 to previously stored user data.

In some instances, the inventory management system group users within the facility into respective sessions. That is, the inventory management system 422 may utilize the sensor data to determine groups of users that are effectively "together" (e.g., shopping together). In some instances, a particular session may include multiple users that entered the facility 402 together and, potentially, that navigate the facility together. For example, when a family of two adults and two children enter the facility together, the inventory management system may associate each user with a particular session. Tracking sessions in addition to individual users may help in determining the outcome of individual events, given that users within a session may not only individually pick or return or otherwise interact with items, but may also pass the items back and forth amongst each other. For instance, a child in the above example may pick the box of cereal before handing the box to her mother, who may place it in her tote 418. Noting the child and the mother as belonging to the same session may increase the chances of successfully adding the box of cereal to the virtual shopping cart of the mother.

By determining the occurrence of one or more events 424 and the output data 426 associated therewith, the inventory management system 422 is able to provide one or more services to the users 416 of the facility 402. By utilizing one or more human associates to process inquiry data and generate response data that may then be used to produce output data 426, overall accuracy of the system may be enhanced. The enhanced accuracy may improve the user experience of the one or more users 416 of the facility 402.

Figure 5:
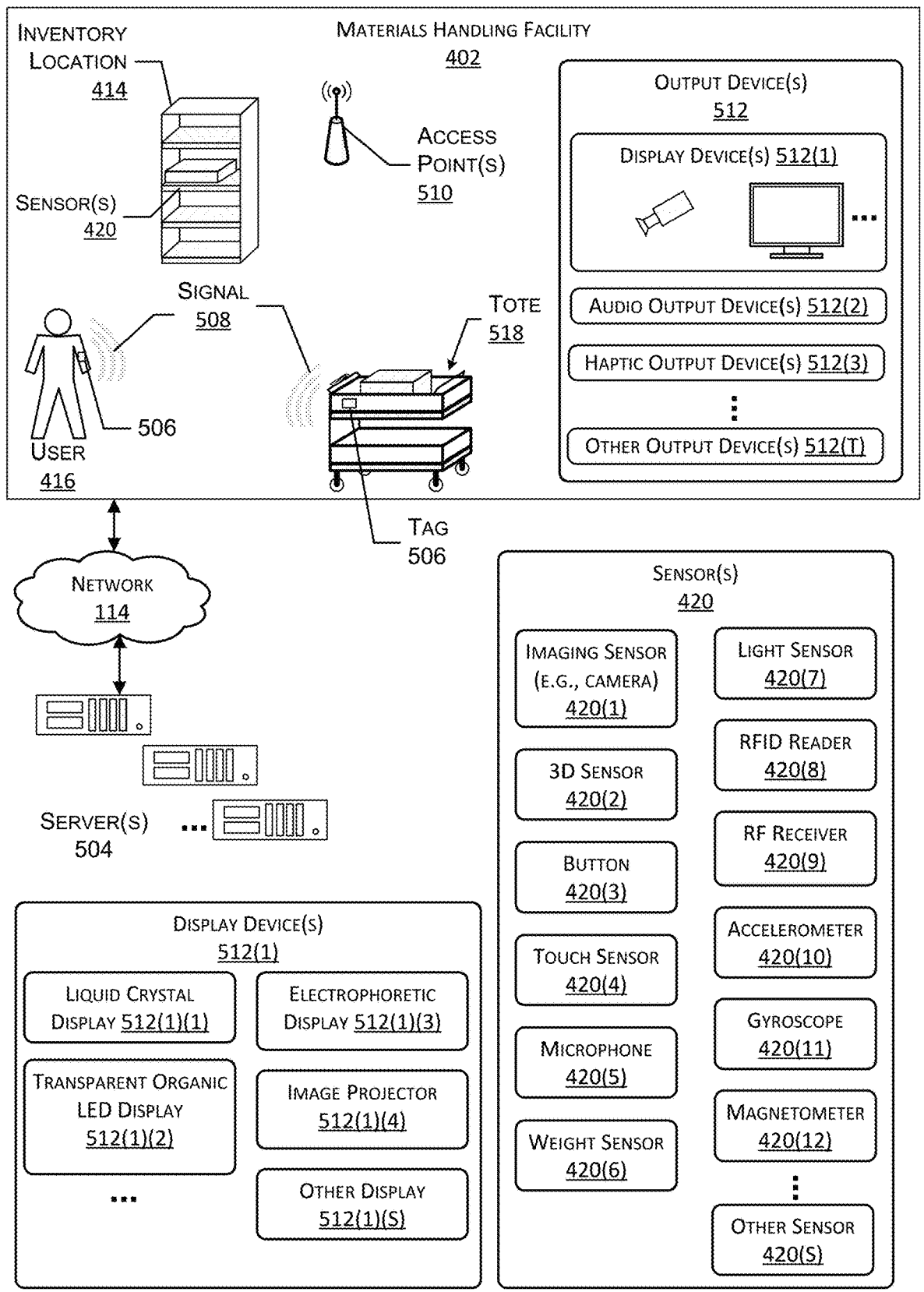
FIG. 5 is a block diagram illustrating additional details of the facility, including example sensors that may facilitate maintaining accurate states of virtual shopping carts of users within the facility.

FIG. 5 is a block diagram illustrating additional details of the facility 402, according to some implementations. The facility 402 may be connected to one or more networks 114, which in turn connect to one or more servers 504. The network 114 may include private networks such as an institutional or personal intranet, public networks such as the Internet, or a combination thereof. The network 114 may utilize wired technologies (e.g., wires, fiber optic cable, and so forth), wireless technologies (e.g., radio frequency, infrared, acoustic, optical, and so forth), or other connection technologies. The network 114 is representative of any type of communication network, including one or more of data networks or voice networks. The network 114 may be implemented using wired infrastructure (e.g., copper cable, fiber optic cable, and so forth), a wireless infrastructure (e.g., cellular, microwave, satellite), or other connection technologies.

The servers 504 may be configured to execute one or more modules or software applications associated with the inventory management system 422. While the servers 504 are illustrated as being in a location outside of the facility 402, in other implementations, at least a portion of the servers 504 may be located at the facility 402. The servers 504 are discussed in more detail below with regard to FIG. 6.

The users 416, the totes 418, or other objects in the facility 402 may be equipped with one or more tags 506, such as radio frequency (RF) tags. The tags 506 may be configured to emit a signal 508. In one implementation, the tag 506 may be a radio frequency identification (RFID) tag configured to emit a RF signal 508 upon activation by an external signal. For example, the external signal may comprise a radio frequency signal or a magnetic field configured to energize or activate the RFID tag 506. In another implementation, the tag 506 may comprise a transmitter and a power source configured to power the transmitter. For example, the tag 506 may comprise a Bluetooth Low Energy (BLE) transmitter and battery. In other implementations, the tag 506 may use other techniques to indicate presence. For example, an acoustic tag 506 may be configured to generate an ultrasonic signal which is detected by corresponding acoustic receivers. In yet another implementation, the tag 506 may be configured to emit an optical signal.

The inventory management system 422 may be configured to use the tags 506 for one or more of identification of the object, determining a location of the object, and so forth. For example, the users 416 may wear tags 506, the totes 418 may have tags 506 affixed, and so forth, which may be read and, based at least in part on signal strength, used to determine identity and location. Generally, the inventory management system 422 or other systems associated with the facility 402 may include any number and combination of input components, output components, and servers 504.

The one or more sensors 420 may be arranged at one or more locations within the facility 402. For example, the sensors 420 may be mounted on or within a floor, wall, at a ceiling, at an inventory location 414, on the tote 418, may be carried or worn by the user 416, and so forth. The sensors 420 produce respective sensor data.

The sensors 420 may include one or more imaging sensors 420(1). These imaging sensors 420(1) may include cameras configured to acquire images of a scene. The imaging sensors 420(1) are configured to detect light in one or more wavelengths including, but not limited to, terahertz, infrared, visible, ultraviolet, and so forth. The imaging sensors 420(1), as well as any image sensors described herein, may provide sensor data in the form of the image data, in the form of indications of what item was picked or return and the location of the item, combinations thereof, and/or the like. The inventory management system 422 may use image data acquired by the imaging sensors 420(1) during operation of the facility 402. For example, the inventory management system 422 may identify items 404, identify users 416, identify totes 418, determine a location, and so forth, based at least in part on their appearance within the image data.

One or more three-dimensional (3D) sensors 420(2) may also be included in the sensors 420. The 3D sensors 420(2) are configured to acquire spatial or 3D data, such as depth information, about objects within a sensor field-of-view. The 3D sensors 420(2) include range cameras, lidar systems, sonar systems, radar systems, structured light systems, stereo vision systems, optical interferometry systems, and so forth. The inventory management system 422 may use the 3D data acquired to identify objects, determine a location of an object, and so forth. For example, the inventory management system 422 may determine operational data such as location in the facility 402 of the user 416 based at least in part on the location in 3D space of the user 416.

One or more buttons 420(3) are configured to accept input from the user 416. The buttons 420(3) may comprise mechanical, capacitive, optical, or other mechanisms. For example, the buttons 420(3) may comprise mechanical switches configured to accept an applied force from a touch of the user 416 to generate an input signal. The inventory management system 422 may use data from the buttons 420(3) to receive information from the user 416 and produce button data.

The sensors 420 may include one or more touch sensors 420(4). The touch sensors 420(4) may use resistive, capacitive, surface capacitance, projected capacitance, mutual capacitance, optical, Interpolating Force-Sensitive Resistance (IFSR), or other mechanisms to determine the position of a touch or near-touch and generate touch sensor data. For example, the IFSR may comprise a material configured to change electrical resistance responsive to an applied force. The position within the material of that change in electrical resistance may indicate the position of the touch. The inventory management system 422 may use data from the touch sensors 420(4) to receive information from the user 416. For example, the touch sensor 420(4) may be integrated with the tote 418 to provide a touchscreen with which the user 416 may select from a menu one or more particular items 404 for picking.

One or more microphones 420(5) may be configured to acquire information indicative of sound present in the environment and generate audio data. In some implementations, arrays of microphones 420(5) may be used. These arrays may implement beamforming techniques to provide for directionality of gain. The inventory management system 422 may use the one or more microphones 420(5) to acquire information from acoustic tags, accept voice input from the users 416, determine the location of one or more users 416 in the facility 402, determine ambient noise level, and so forth.

One or more weight sensors 420(6) are configured to measure the weight of a load, such as the item 404, the user 416, the tote 418, and so forth and generate weight data. The weight sensors 420(6) may be configured to measure the weight of the load at one or more of the inventory locations 414, the tote 418, or on the floor of the facility 402. The weight sensors 420(6) may include one or more sensing mechanisms to determine weight of a load. These sensing mechanisms may include piezoresistive devices, piezoelectric devices, capacitive devices, electromagnetic devices, optical devices, potentiometric devices, microelectromechanical devices, and so forth. The sensing mechanisms may operate as transducers, which generate one or more signals based on an applied force, such as that of the load due to gravity. The inventory management system 422 may use the data acquired by the weight sensors 420(6) to identify an object, determine a location of an object, maintain shipping records, identify the user 416, and so forth. In addition to the weight data, the weight sensors 420(6) may send an indication of an item picked or returned and a location of the item, an indication of a cost of an item removed, combinations there, and/or the like. Further, each of the sensors 420 may provide this type of data.

The sensors 420 may include one or more light sensors 420(7) configured to generate light sensor data. The light sensors 420(7) may be configured to provide information associated with ambient lighting conditions such as a level of illumination. Information acquired by the light sensors 420(7) may be used by the inventory management system 422 to adjust a level, intensity, or configuration of the user interface.

One more radio frequency identification (RFID) readers 420(8), near field communication (NFC) systems, and so forth, may also be provided in the sensors 420. For example, the RFID readers 420(8) may be configured to read the tags 506 and generate RFID tag data. Information acquired by the RFID reader 420(8) may be used by the inventory management system 422 to identify an object associated with the tag 506 such as the item 404, the user 416, the tote 418, and so forth. For example, based on information from the RFID readers 420(8), a velocity of the tag 506 may be determined.

One or more RF receivers 420(9) may also be provided in the sensors 420 to generate radio-frequency data. In some implementations, the RF receivers 420(9) may be part of transceiver assemblies. The RF receivers 420(9) may be configured to acquire RF signals 208 associated with Wi-Fi™, Bluetooth®, ZigBee®, Z-Wave, 3G, 4G, LTE, or other wireless data transmission technologies. The RF receivers 420(9) may provide information associated with data transmitted via radio frequencies, signal strength of RF signals 208, and so forth. For example, information from the RF receivers 420(9) may be used by the inventory management system 422 to determine a location of an RF source, such as a communication interface onboard the tote 418 or carried by the user 416.

The sensors 420 may include one or more accelerometers 420(10) that may be worn or carried by the user 416, mounted to the tote 418, and so forth. The accelerometers 420(10) may provide accelerometer data such as the direction and magnitude of an imposed acceleration. Data such as rate of acceleration, determination of changes in direction, speed, and so forth, may be determined using the accelerometers 420(10).

A gyroscope 420(11) provides gyroscope data indicative of rotation of an object affixed thereto. For example, the tote 418, the user 416, or other objects may be equipped with a gyroscope 420(11) to provide data indicative of a change in orientation.

A magnetometer 420(12) may be used to determine an orientation by measuring ambient magnetic fields, such as the terrestrial magnetic field. The magnetometer 420(12) may generate magnetometer data indicative of the direction, strength, and so forth of a magnetic field. The magnetometer 420(12) may be worn or carried by the user 416, mounted to the tote 418, and so forth. For example, the magnetometer 420(12) mounted to the tote 418 may act as a compass and provide information indicative of which way the tote 418 is oriented.

The sensors 420 may include other sensors 420(S) as well. For example, the other sensors 420(S) may include proximity sensors, ultrasonic rangefinders, thermometers, barometric sensors, hygrometers, biometric input devices including, but not limited to, fingerprint readers or palm scanners, and so forth. For example, the inventory management system 422 may use information acquired from thermometers and hygrometers in the facility 402 to direct the user 416 to check on delicate items 404 stored in a particular inventory location 414.

The facility 402 may include one or more access points 510 configured to establish one or more wireless networks and the network 114. The access points 510 may use Wi-Fi™, NFC, Bluetooth®, or other technologies to establish wireless communications between a device and the network 114. The wireless networks allow the devices to communicate with one or more of the inventory management system 422, the sensors 420, the tag 506, a communication device of the tote 418, or other devices.

Output devices 512 may also be provided in the facility 402. The output devices 512 are configured to generate signals which may be perceived by the user 416. The output devices 512 may include display devices 512(1), audio output devices 512(2), haptic output devices 512(3), or other output devices 512(T).

The display devices 512(1) may be configured to provide output which may be seen by the user 416 or detected by a light-sensitive detector such as an imaging sensor 420(1) or light sensor 420(7). The output may be monochrome or color. The display devices 512(1) may be emissive, reflective, or both. An emissive display device 512(1) is configured to emit light during operation. For example, a light emitting diode (LED) is an emissive visual display device 512(1). In comparison, a reflective display device 512(1) relies on ambient light to present an image. For example, an electrophoretic display 512(1)(3) is a reflective display device 512(1). Backlights or front lights may be used to illuminate the reflective visual display device 512(1) to provide visibility of the information in conditions where the ambient light levels are low.

Mechanisms of the display devices 512(1) may include liquid crystal displays 512(1)(1), transparent organic LED displays 512(1)(2), electrophoretic displays 512(1)(3), image projectors 512(1)(4), or other displays 512(1)(S). The other displays 512(1)(S) may include, but are not limited to, micro-electromechanical systems (MEMS), spatial light modulators, electroluminescent displays, quantum dot displays, liquid crystal on silicon (LCOS) displays, cholesteric displays, interferometric displays, and so forth. These mechanisms are configured to emit light, modulate incident light emitted from another source, or both.

The display devices 512(1) may be configured to present images. For example, the display devices 512(1) may comprise a pixel-addressable display. The image may comprise at least a two-dimensional array of pixels or a vector representation of an at least two-dimensional image.

In some implementations, the display devices 512(1) may be configured to provide non-image data, such as text characters, colors, and so forth. For example, a segmented electrophoretic display 512(1)(3), segmented LED, and so forth, may be used to present information such as a stock keeping unit (SKU) number. The display devices 512(1) may also be configurable to vary the color of the text, such as using multicolor LED segments.

In some implementations, display devices 512(1) may be configurable to provide image or non-image output. For example, an electrophoretic display 512(1)(3) with addressable pixels may be used to present images of text information, or all of the pixels may be set to a solid color to provide a colored panel.

One or more audio output devices 512(2) are configured to provide acoustic output. The acoustic output includes one or more of infrasonic sound, audible sound, or ultrasonic sound. The audio output devices 512(2) may use one or more mechanisms to generate the sound. These mechanisms may include, but are not limited to, the following: voice coils, piezoelectric elements, magnetorestrictive elements, electrostatic elements, and so forth. For example, a piezoelectric buzzer or a speaker may be used to provide acoustic output.

Haptic output devices 512(3) are configured to provide a signal which results in a tactile sensation to the user 416. The haptic output devices 512(3) may use one or more mechanisms such as electrical stimulation or mechanical displacement to provide the signal. For example, the haptic output devices 512(3) may be configured to generate a modulated electrical signal, which produces an apparent tactile sensation in one or more fingers of the user 416. In another example, the haptic output devices 512(3) may comprise piezoelectric or rotary motor devices configured to provide a vibration, which may be felt by the user 416.

The facility 402 may include an interface device that comprises the sensors 420, the output devices 512, or both. For example, the tote 418 may include an interface device such as a display device 512(1) and a touch sensor 420(4). In some implementations, the interface device may include hardware processors, memory, and other elements configured to present a user interface, process input to the user interface, and so forth. Users 416, associates, or both users 416 and associates may use the interface device.

Other output devices 512(T) may also be present. For example, the other output devices 512(T) may include scent/odor dispensers, document printers, 3D printers or fabrication equipment, and so forth.

The inventory management system 422 may generate user interface data, which is then used by the interface device to present the user interface. The user interface may be configured to stimulate one or more senses of the user 416 or associate. For example, the user interface may comprise visual, audible, and haptic output.

Figure 6:
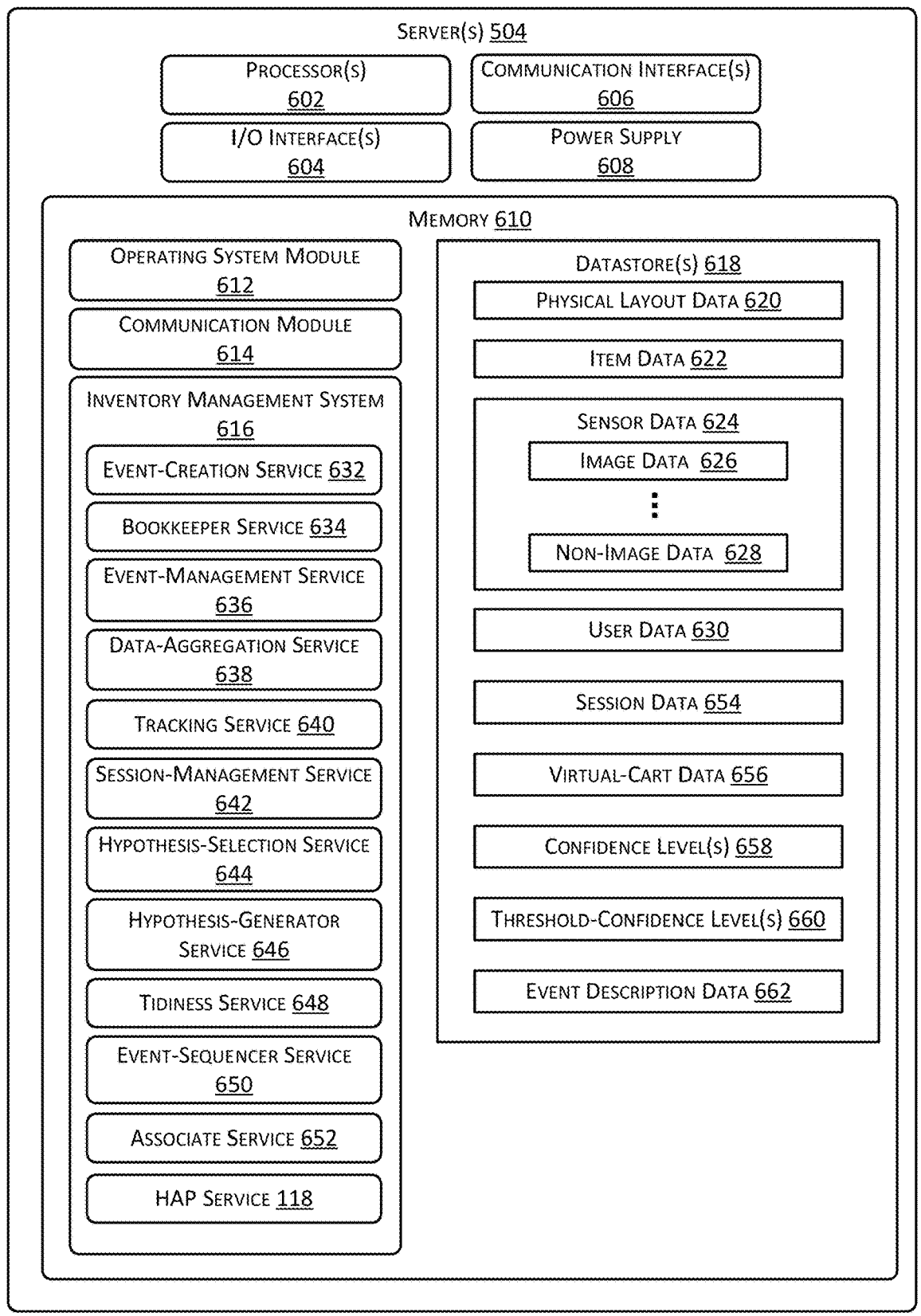
FIG. 6 illustrates a block diagram of one or more servers configured to support operation of the facility. As illustrated, the servers may host an inventory management system configured to maintain the state of the virtual shopping carts.

FIG. 6 illustrates a block diagram of the one or more servers 504. The servers 504 may be physically present at the facility 402, may be accessible by the network 114, or a combination of both. The servers 504 does not require end-user knowledge of the physical location and configuration of the system that delivers the services. Common expressions associated with the servers 504 may include "on-demand computing," "software as a service (SaaS)," "platform computing," "network-accessible platform," "cloud services," "data centers," and so forth. Services provided by the servers 504 may be distributed across one or more physical or virtual devices.

The servers 504 may include one or more hardware processors 602 (processors) configured to execute one or more stored instructions. The processors 602 may comprise one or more cores. The servers 504 may include one or more input/output (I/O) interface(s) 604 to allow the processor 602 or other portions of the servers 504 to communicate with other devices. The I/O interfaces 604 may comprise Inter-Integrated Circuit (I2C), Serial Peripheral Interface bus (SPI), Universal Serial Bus (USB) as promulgated by the USB Implementers Forum, RS-232, and so forth.

The servers 504 may also include one or more communication interfaces 606. The communication interfaces 606 are configured to provide communications between the servers 504 and other devices, such as the sensors 420, the interface devices, routers, the access points 510, and so forth. The communication interfaces 606 may include devices configured to couple to personal area networks (PANs), wired and wireless local area networks (LANs), wired and wireless wide area networks (WANs), and so forth. For example, the communication interfaces 606 may include devices compatible with Ethernet, Wi-Fi™, and so forth. The servers 504 may also include one or more busses or other internal communications hardware or software that allow for the transfer of data between the various modules and components of the servers 504.

The servers 504 may also include a power supply 608. The power supply 608 is configured to provide electrical power suitable for operating the components in the servers 504.

As shown in FIG. 6, the servers 504 includes one or more memories 610. The memory 610 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 610 provides storage of computer-readable instructions, data structures, program modules, and other data for the operation of the servers 504. A few example functional modules are shown stored in the memory 610, although the same functionality may alternatively be implemented in hardware, firmware, or as a system on a chip (SOC).

The memory 610 may include at least one operating system (OS) module 612. The OS module 612 is configured to manage hardware resource devices such as the I/O interfaces 604, the communication interfaces 606, and provide various services to applications or modules executing on the processors 602. The OS module 612 may implement a variant of the FreeBSD™ operating system as promulgated by the FreeBSD Project; other UNIX™ or UNIX-like variants; a variation of the Linux™ operating system as promulgated by Linus Torvalds; the Windows® Server operating system from Microsoft Corporation of Redmond, Wash., USA; and so forth.

One or more of the following modules may also be stored in the memory 610. These modules may be executed as foreground applications, background tasks, daemons, and so forth.

A communication module 614 may be configured to establish communications with one or more of the sensors 420, one or more of the devices used by associates, other servers 504, or other devices. The communications may be authenticated, encrypted, and so forth.

The memory 610 may store an inventory management system 616. The inventory management system 616 is configured to provide the inventory functions as described herein with regard to the inventory management system 422. For example, the inventory management system 616 may track movement of items 404 in the facility 402, generate user interface data, and so forth.

The inventory management system 616 may access information stored in one or more data stores 618 in the memory 610. The data store 618 may use a flat file, database, linked list, tree, executable code, script, or other data structure to store the information. In some implementations, the data store 618 or a portion of the data store 618 may be distributed across one or more other devices including other servers 504, network attached storage devices, and so forth.

The data store 618 may include physical layout data 620. The physical layout data 620 provides a mapping of physical locations within the physical layout of devices and objects such as the sensors 420, inventory locations 414, and so forth. The physical layout data 620 may indicate the coordinates within the facility 402 of an inventory location 414, sensors 420 within view of that inventory location 414, and so forth. For example, the physical layout data 620 may include camera data comprising one or more of a location within the facility 402 of an imaging sensor 420(1), orientation of the imaging sensor 420(1), the operational status, and so forth. Continuing example, the physical layout data 620 may indicate the coordinates of the imaging sensor 420(1), pan and tilt information indicative of a direction that the field of view 428 is oriented along, whether the imaging sensor 420(1) is operating or malfunctioning, and so forth.

In some implementations, the inventory management system 616 may access the physical layout data 620 to determine if a location associated with the event 424 is within the field of view 428 of one or more sensors 420. Continuing the example above, given the location within the facility 402 of the event 424 and the camera data, the inventory management system 616 may determine the cameras 420(1) that may have generated images of the event 424.

The item data 622 comprises information associated with the items 404. The information may include information indicative of one or more inventory locations 414 at which one or more of the items 404 are stored. The item data 622 may also include order data, SKU or other product identifier, price, quantity on hand, weight, expiration date, images of the item 404, detail description information, ratings, ranking, and so forth. The inventory management system 616 may store information associated with inventory management functions in the item data 622.

The data store 618 may also include sensor data 624. The sensor data 624 comprises information acquired from, or based on, the one or more sensors 420. For example, the sensor data 624 may comprise 3D information about an object in the facility 402. As described above, the sensors 420 may include an imaging sensor 420(1), which is configured to acquire one or more images. These images may be stored as the image data 626. The image data 626 may comprise information descriptive of a plurality of picture elements or pixels. Non-image data 628 may comprise information from other sensors 420, such as input from the microphones 420(5), weight sensors 420(6), and so forth.

User data 630 may also be stored in the data store 618. The user data 630 may include identity data, information indicative of a profile, purchase history, location data, images of the user 416, demographic data, and so forth. Individual users 416 or groups of users 416 may selectively provide user data 630 for use by the inventory management system 422. The individual users 416 or groups of users 416 may also authorize collection of the user data 630 during use of the facility 402 or access to user data 630 obtained from other systems. For example, the user 416 may opt-in to collection of the user data 630 to receive enhanced services while using the facility 402.

In some implementations, the user data 630 may include information designating a user 416 for special handling. For example, the user data 630 may indicate that a particular user 416 has been associated with an increased number of errors with respect to output data 426. The inventory management system 616 may be configured to use this information to apply additional scrutiny to the events 424 associated with this user 416. For example, events 424 that include an item 404 having a cost or result above the threshold amount may be provided to the associates for processing regardless of the determined level of confidence in the output data 426 as generated by the automated system.

The inventory management system 616 may include one or more of an event-creation service 632, a bookkeeper service 634, an event-management service 636, a data-aggregation service 638, a tracking service 640, a session-management service 642, a hypothesis-selection service 644, a hypothesis-generator service 646, a tidiness service 648, an event-sequencer service 650, an associate service 652, and the HAP service 118 described above. The event-creation service 632 may function to receive a set of sensor data indicative of an occurrence of an event within the facility 402. In response, the event-creation service 632 may initially verify that the sensor data does in fact potentially represent an event prior to taking further action. That is, the event-creation service 632 may apply one or more heuristics to the data to ensure that the sensor data is simply noise (e.g., the shaking of a shelf rather than the removal of an item) rather than an event. If the event-creation service 632 determines that the data is indicative of an event, the event-creation service 632 may create a unique identifier associated with the event and provide the identifier to the bookkeeper service 634. The bookkeeper service 634 may then create an event record indicative of the event and store the event record designated by the event identifier in a database, such as the data store 618.

In addition to the above, the event-creation service 632 may send the sensor data, a location to the sensor data, in an indication of the event to the event-management service 636. The event-management service 636 may then generate an shopping-event summary file that includes the identifier of the event (as received from the event-creation service 632) and that includes one or more fields to be filled by data-aggregation service 638. In some instances, the fields of the file may include one or more of the person(s) associated with the event (e.g., the person that picked an item, returned an item, etc.), the item(s) associated with the event (e.g., the identifier of the item(s), the quantity, etc.), and the action(s) taken with respect to the item(s) (e.g., noting that an item was picked, that an item was returned, that a user left the store, etc.). In some instances, the field indicating the person(s) associated with the event may indicate both a person (or more) that is determined to be most likely to be associated with the event as well as one or more other candidate people that may have been associated with the event. For instance, the former may be identified as having the highest confidence value in association with the event, while the latter may comprise the next "N" number of people ranked according to confidence value (or the number of "N" people having confidence values associated with the event that is greater than a threshold).

After generating the shopping-event summary file, the event-management service 636 may provide this file (generally unfilled) to the data-aggregation service 638, potentially along with the sensor data or information indicating a network location the sensor data. The data-aggregation service 638 may then proceed to attempt to fill in the remaining fields of the file. For instance, the data-aggregation service 638 (or another service, such as the event-management service 636) may determine a time associated with the event and a location associated with the event for the purpose of determining the user most likely associated with the event. That is, the data-aggregation service 638 may analyze the sensor data to determine the time (e.g., the time range) at which the event occurred, as well as a location within the facility 402 at which the event occurred (e.g., a particular lane and/or shelf of the facility 402). The data-aggregation service 638 may then provide an indication of the time and location of the event to the tracking service 640.

The tracking service 640, meanwhile, functions to track users within the environment of the facility to allow the inventory management system 616 to assign certain events to the correct users. That is, the tracking service 616 may assign unique identifiers to users as they enter the facility and, with the users' consent, may track the users throughout the facility 402 over the time they remain in the facility 402. As discussed above, the tracking service 640 may perform this tracking using sensor data 624, such as the image data 626. For example, the tracking service 640 may receive the image data 626 and may use facial-recognition techniques to identify users from the images. After identifying a particular user within the facility, the tracking service 640 may then track the user within the images as the user moves throughout the facility 402. Further, should the tracking service 640 temporarily "lose" a particular user, the tracking service 640 may again attempt to identify the users within the facility based on facial recognition, and/or using other techniques such as voice recognition, or the like.

Therefore, upon receiving the indication of the time and location of the event in question, the tracking service 640 may query the data store 618 to determine which one or more users were at or within a threshold distance of the location of the event at the particular time of the event. Further, the tracking service 640 may assign different confidence values to different users, with the confidence values indicating how likely it is that each corresponding user is the user that is in fact associated with the event of interest. In some instances, the tracking service 640 returns, to the data-aggregation service 638, an identity of the user having the highest confidence value with respect to the event, as well as one or more additional identities of users having lower confidence (e.g., confidence values that are less than the highest level but above a threshold confidence value). In response to receiving this information, the data-aggregation service 638 may fill out the corresponding portions of the shopping-event summary form. That is, the data-aggregation service 638 may indicate the identity of the user associated with the user determined to most likely be associated with the event. In some instances, the data-aggregation service 638 may also indicate, on the shopping-event summary field, identities of the other users determined to be candidates for the event.

After receiving the user identities from the tracking service 640, the data-aggregation service 638 may attempt determine the identity of any users associated with a session of the user associated with the event as well as the identities of any users associated with a session of the candidate users. To do so, the data-aggregation service 638 may send indications of the identities of the user and the candidate user(s) to a session-management service 642. The session-management service 642 may function to identify users within the facility 402 that are to be treated as related to one another for the purpose of determining the occurrence of events. For instance, the session-management service 642 may determine that three people that walk into the store together are to be associated with a particular session (denoted by a particular session identifier). Additionally or alternatively, the session-management service 642 may determine that two users are family members and, thus, are to be associated with a common session when they are within the same facility 402 at the same time-of-day. After making these determinations, the session-management service 642 may then store an indication of the respective sessions in the data store 618 as session data 654. The session data 654 may identify which users are associated with which sessions.

In other instance, a session may comprise two user identifiers that, while unique relative to one another, are actually associated with the same user. For instance, envision that the tracking service 640 tracks a particular user but loses track of the user while the user remains in the facility. Thereafter, the tracking service 640 begins tracking a user (the same particular user). While the user may comprise the same user, the tracking service 640 may simply create a new user identifier for the newly tracked individual, being initially unaware that it is in fact the same user. Therefore, when the tracking service 640 determines that the user is in fact the particular user, the session-management service may 342 associate the new user identifier with the session identifier to which the initial user identifier of the particular user was associated.

Upon receiving the user identitie(s), the session-management service 642 may determine any sessions that the users are a part of and may return respective identities of any other users that are associated with those particular sessions. The session-management service 642 may then return this information back to the data-aggregation service 638. The data-aggregation service 638 may then acquire, from the data store 618, virtual cart data 656 for these users. That is, the data-aggregation service 638 may acquire: (1) the current state of the virtual shopping cart for the user determined to most likely be associated with the event, (2) the current state of the virtual shopping cart for the candidate users, and (3) the current state of the virtual shopping cart for other users associated with the respective session of the users from (1) and (2).

In addition, the data-aggregation service 638 may request, from the hypothesis-selection service 644, an indication of a particular hypothesis generator to call of determining the information regarding the item(s) associated with the event and the actions likely taken. In response, the hypothesis-selection service 644 may select which hypothesis generator of multiple hypothesis-generator should be used by the data-aggregation service 638 to determine the outcome of the event. For instance, the service 644 may send an indication of a network location (e.g., a uniform resource locator (URL) address) to the data-aggregation service 638. In some instances, the service 644 make this selection based on one or more parameters associated with the event, such based on an attribute of the sensor data. In one instance, the service 644 selects a particular hypothesis generator based on an attribute of the sensor data, such as which sensor(s) provided the sensor data.

Upon receiving the network location of the selected hypothesis generator, the data-aggregation service 638 may provide the sensor data (or information for obtaining the sensor data) and the current states of the applicable virtual shopping carts (or information for obtaining the virtual carts) to the hypothesis-generator service 646. In some instances, the hypothesis-generator service 646 stores or otherwise has access to multiple different hypothesis generators, as discussed immediately above. Each hypothesis generator, meanwhile, may function to algorithmically determine information regarding an event based, such as the item(s) associated with the event, the actions taken with respect to the event, and the like. In some instances, the hypothesis-generator service 646 may also make this determination with reference to a state of the location of the event at the time of the event. For example, the hypothesis-generator service 648 may inquire to the tidiness service 648 whether the shelf or other location associated with the event was "tidy" or "untidy" at the time of the event. That is, the tidiness service 648 may maintain, for respective shelves or other locations over time, an indication of whether a particular shelf includes only the items it is supposed to include (e.g., only cans of peaches on a peach shelf) or whether it contains one or more other items that is not designated for that shelf or location (e.g., the peach shelf including a jar of green beans). Based on analysis of the cart contents, the identified user(s), the tidiness of the location of the event at the time of the event, and potentially other factors, the selected hypothesis generator may analyze the sensor data in view of current contents of the virtual cart of the user most likely to be associated with the event to determine what occurred during the time associated with the event. As described above, the result may be that a user picked a particular item, returned a particular item, or the like. In some instances, the hypothesis generator comprises one or more models that have been trained using known data. For instance, the models may be trained using input sensor and an indication of the actual items picked, returned, or the like. After training each respective model, the hypothesis generator may be used to generate a respective outcome of the respective event. That is, the hypothesis generator may compare the one or more models to incoming sensor data to determine the most likely outcome, as well as probabilities associated with other potential outcomes.

The hypothesis-generator service 646 may then provide an indication of the item(s) and the corresponding action(s) back to the data-aggregation service 638. In addition, the hypothesis-generator service 646 may calculate, and provide back to the data-aggregation service 638, a confidence value associated with the item, a confidence value associated with the action, a confidence value associated with both, or the like. In addition, if the hypothesis generator determined that the shelf or other location associated with the event changed from tidy to untidy (or vice versa) based on its analysis, then the hypothesis-generator service 646 may provide this indication to the data-aggregation service 638.

The data-aggregation service 638 may then update the shopping-event summary file to indicate the item(s), action(s), and confidence values and may send the now-completed file back to the event-management service 636. The event-management service 636 may then update the data store 618 to indicate the item(s), action(s), and confidence value(s). For instance, the event-management service 636 may store the confidence value(s) 358 in the data store 618 and may update the virtual-cart data 656 associated with the user determined to be associated with the event. In addition, the event-management service 636 may also send the completed event-summary file including the identity of the user and the indication of the item and the action taken with respect to the item to an event-sequencer service 650 that maintains a timeline of events that occur within the facility. The event-sequencer service 650 may determine whether the event is out-of-order which respect to other processed events.

FIG. 6 illustrates that information regarding a particular event may be stored as event description data 660 in one of the data stores 618. Additionally, if the data-aggregation service 638 indicated that the shelf or other location associated with the event has changed from tidy to untidy (or vice versa), the event-management service 636 may send an indication to the tidiness service 648, which may update its database.

Finally, the event-management service 636 may send an indication to the bookkeeper service 634 to indicate that the event, identified by its unique identifier, is now complete. In response, the bookkeeper service 634 may update the event record in the data store 618 to indicate that the event has been completed.

The associate service 652, meanwhile, may monitor the outcome of the event to determine whether to take further action on the event. That is, the associate service 652 may compare the confidence value associated with a particular completed event to a threshold-confidence value 360 to determine whether human confirmation is needed regarding the outcome of the event. If the confidence value for the event as determined by the hypothesis-generator service 646 is greater than the threshold-confidence value 360, then the associate service 652 may an indication that the event is complete to the bookkeeper service 634. Having now received an indication of completion from both the event-management service 636 and the associate service 652, the bookkeeper service 634 may now mark the outcome of the event as complete and determinative.

If, however, the associate service 652 determines that the confidence value of the event is less than the threshold-confidence value 360, then the associate service 652 may initiate a process for human involvement regarding the outcome of the event. For instance, the associate service 652 may send the sensor data or information for obtaining the sensor data to one or more devices of human associates. These associates may analyze the data (e.g., watch a video clip, etc.) and provide output data indicative of the result of the event (e.g., the item involved, the action taken, etc.). The associate service 652 may then receive this output data and, if the output data differs from the results of the previous event, sends a request to generate a new event to the event-creation service 632, which creates and sends a new event identifier to the bookkeeper service. The event-creation service 632 may also send an indication of the new event to the event-management service 636, which may generate a new shopping-event summary form, in this instance filled out with the output data provided by the associate service 652. The event-management service 636 may also send a request to cancel the previous event record, identified with its unique identifier, to event-sequencer service 650 and may undo the previous update to the state of the virtual-cart data 656. The output data of the new event, meanwhile, may result in the updating of a different virtual cart, the same virtual cart in a different manner, and/or the like.

In some instances, the HAP service 118 may determine whether to invoke the associate service 652 as described above. For example, in some instances the hypothesis-generator service 646 may comprise the first hypothesis source 116 that determines the result of an event and a corresponding confidence value of the result. If the result is low-confidence, the HAP service may determine the likelihood that the second hypothesis source 120 would agree with the result determined by the service 646. If the likelihood is greater than a relatively high threshold, then the HAP service may promote the result from low-confidence to high-confidence and the result may be stored (e.g., the virtual cart(s) may be updated, etc.). If, meanwhile, the likelihood is less than the relatively high threshold, but greater than a moderate threshold, then the HAP service 118 may invoke the second hypothesis source 120, in this instance the associate service 652. However, to begin, the HAP service may send inquiry data to a relatively small number of computing devices operated by human associates (e.g., a single computing device). If the small number of human associates confirm the result, then the HAP service 118 may promote the result from low- to high-confidence. If not, or if the likelihood of agreement calculated by the HAP service 118 is less than both the relatively high and the moderate thresholds, then the HAP service 118 may invoke the associate service 652 to its normal extent. That is, the HAP service 118 may cause a second, greater number of human associates to analyze the inquiry data to determine a high-confidence result of the event.

Embodiments described herein may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
   receiving first sensor data indicative of a first event in a facility;
   sending at least one of the first sensor data or information for obtaining the first sensor data to a first hypothesis source;
   receiving an indication of a first hypothesis of a result of the first event from the first hypothesis source, the first hypothesis indicating that a first user performed a first action with respect to a first item;
   receiving a first confidence value from the first hypothesis source, the first confidence value indicating an estimation of accuracy of the first hypothesis;
   determining that the first confidence level is less than a first threshold;
   receiving data associated with the first event based at least in part on the sensor data;
   inputting the data into a model;
   receiving, based at least in part on the inputting, a second confidence value, the second confidence value indicating a likelihood that a second hypothesis source would determine the first hypothesis based at least in part on the first sensor data;
   determining that the second confidence value is greater than a second threshold;
   storing, in cart data associated with the first user, an indication that the first user performed the first action with respect to the first item;

receiving second sensor data indicative of a second event;
determining, based at least in part on the second sensor data, that the second event comprises the first user exiting the facility; and
charging a payment instrument associated with the first user for items indicated in the cart data associated with the first user.

2. The method as recited in claim 1, further comprising:
receiving third sensor data associated with a third event;
sending at least one of the third sensor data or information for obtaining the third sensor data to the first hypothesis source;
receiving an indication of a second hypothesis of a result of the third event from the first hypothesis source, the second hypothesis indicating that a second user performed a second action with respect to a second item;
receiving a third confidence value from the first hypothesis source, the third confidence value indicating an estimation of accuracy of the second hypothesis of the third event;
determining that the third confidence value is less than the first threshold;
receiving second data associated with the third event based at least in part on the third sensor data;
inputting the second data into the model;
receiving, based at least in part on inputting the second data into the model, a fourth confidence value, the fourth confidence value indicating a likelihood that the second hypothesis source would determine the second hypothesis of the third event based at least in part on the third sensor data;
determining that the fourth confidence value is less than the second threshold; and
sending at least one of the third sensor data or information for obtaining the third sensor data to the second hypothesis source.

3. The method as recited in claim 2, further comprising:
determining that the fourth confidence value is greater than a third threshold;
receiving an indication that the second hypothesis source determined that the second event is associated with the second hypothesis; and
storing, in a profile associated with the second user, an indication that the second user performed the second action with respect to the second item.

4. The method as recited in claim 2, further comprising:
determining that the fourth confidence value is less than a third threshold that is less than the second threshold; and
sending at least a portion of the third sensor data or information for obtaining the portion of the third sensor data to an additional instance of the second hypothesis source based at least in part on determining that the fourth confidence value is less than the third threshold.

5. A method comprising:
determining, by a first hypothesis source, a first hypothesis for a result of a first event based at least in part on first sensor data associated with the first event, the first hypothesis indicating that a first user performed a first action with respect to a first item;
determining, by the first hypothesis source, a first confidence value indicating an estimation of accuracy of the first hypothesis;
determining that the first confidence value fails to satisfy one or more criteria;
receiving data associated with the first event, at least a portion of the data based at least in part on the first sensor data;
inputting the data into a model;
determining, from the model, a second confidence value indicating a likelihood that a second hypothesis source that is different than the first hypothesis source would generate a hypothesis consistent with the first hypothesis;
storing, in cart data associated with the first user, an indication that the first user performed the first action with respect to the first item;
determining, based at least in part on second sensor data, that the first user has exited the facility; and
charging a payment instrument associated with the first user for items indicated in the cart data associated with the first user.

6. The method as recited in claim 5, wherein the model comprises a first model, the first hypothesis source comprises a second model, and the determining the first hypothesis by the first hypothesis source comprises:
inputting at least the first sensor data and current contents of the cart data of the first user into the second model; and
receiving, from the second model, an indication of the first hypothesis.

7. The method as recited in claim 5, wherein the first hypothesis source comprises one or more computing devices and the second hypothesis source comprises one or more humans.

8. The method as recited in claim 5, wherein the first hypothesis source comprises one or more computing devices configured to analyze the first sensor data and the second hypothesis source comprises one or more computing devices configured to analyze third sensor data.

9. The method as recited in claim 5, wherein determining that the first confidence value fails to satisfy one or more criteria comprises determining that the first confidence value is less than a first threshold, and further comprising:
determining that the second confidence value is greater than a second threshold; and
storing, based at least in part on determining that the second confidence value is greater than the second threshold, an indication that the first event is associated with the first hypothesis.

10. The method as recited in claim 5, wherein determining that the first confidence value fails to satisfy one or more criteria comprises determining that the first confidence value is less than a first threshold, and further comprising:
determining that the second confidence value is less than a second threshold; and
sending at least one of the first sensor data or information for obtaining the first sensor data to one or more computing devices associated with the second hypothesis source.

11. The method as recited in claim 5, wherein the determining that the first confidence value fails to satisfy one or more criteria comprises determining that the first confidence value is less than a first threshold, and further comprising:
determining that the second confidence value is less than a second threshold but greater than a third threshold; and
sending at least one of the first sensor data or information for obtaining the first sensor data to fewer computing devices of the second hypothesis source than if the second confidence value were less than both the second threshold and the third threshold.

12. The method as recited in claim 5, further comprising:
determining, by the first hypothesis source, a second hypothesis for a result of a third event based at least in part on third sensor data associated with the third event, the third event occurring within at least one of a threshold amount of time of the first event or within a threshold distance from the first event;
determining, by the first hypothesis source, a third confidence value indicating an estimation of accuracy of the second hypothesis;
determining that the third confidence value fails to satisfy the one or more criteria;
receiving second data associated with the third event;
inputting the second data into the model;
receiving a fourth confidence value indicating a likelihood that the second hypothesis source would determine the second hypothesis of the third event;
determining that the fourth confidence value is greater than a second threshold;
determining that the second confidence value is less than the second threshold;
sending at least one of the third sensor data or information for obtaining the third sensor data to one or more computing devices associated with the second hypothesis source; and
sending at least one of the first sensor data or information for obtaining the first sensor data to the one or more computing devices associated with the second hypothesis source.

13. The method as recited in claim 5, wherein:
the first hypothesis indicates that the first user performed, at a first time of day, the first action with respect to the first item located at a first location in an environment; and
the data is based at least in part on the first sensor data and at least one of historical data associated with the first user, historical data associated with the first item, historical data associated with the first location, historical data associated with the first time of day, or historical data associated with the environment.

14. The method as recited in claim 5, further comprising, prior to the determining the first hypothesis:
determining, by the first hypothesis source, a second hypothesis for a result of a third event based at least in part on third sensor data associated with the third event, wherein the third event occurs prior to the first event;
determining, by the first hypothesis source, a third confidence value indicating an estimation of accuracy of the second hypothesis;
determining that the third confidence value fails to satisfy the one or more criteria;
receiving an indication of a determined hypothesis determined by the second hypothesis source; and
training the model based at least in part on the indication of the determined hypothesis, the third sensor data, and the second hypothesis determined by the first hypothesis source.

15. One or more computer-readable media storing computer-executable instructions that, when executed, cause one or more processors to perform acts comprising:
determining, by a first hypothesis source, a first hypothesis for a result of a first event based at least in part on first sensor data associated with the first event, the first hypothesis indicating that a first user performed a first action with respect to a first item;
determining, by the first hypothesis source, a first confidence value indicating an estimation of accuracy of the first hypothesis;
determining that the first confidence value fails to satisfy one or more criteria;
receiving data associated with the first event, at least a portion of the data based at least in part on the first sensor data;
inputting the data into a model;
determining, from the model, a second confidence value indicating a likelihood that a second hypothesis source that is different than the first hypothesis source would generate a hypothesis consistent with the first hypothesis;
storing, in a cart data associated with the first user, an indication that the first user performed the first action with respect to the first item;
determining, based at least in part on second sensor data, that the first user has exited the facility; and
charging a payment instrument associated with the first user for items indicated in the cart data associated with the first user.

16. The one or more computer-readable media as recited in claim 15, wherein the model comprises a first model, the first hypothesis source comprises a second model, and the determining the first hypothesis by the first hypothesis source comprises:
inputting at least the first sensor data and current contents of the cart data of the first user into the second model; and
receiving, from the second model, an indication of the first hypothesis.

17. The one or more computer-readable media as recited in claim 15, wherein the first hypothesis source comprises one or more computing devices and the second hypothesis source comprises one or more humans.

18. The one or more computer-readable media as recited in claim 15, wherein the first hypothesis source comprises one or more computing devices configured to analyze the first sensor data and the second hypothesis source comprises one or more computing devices configured to analyze third sensor data.

19. The one or more computer-readable media as recited in claim 15, wherein determining that the first confidence value fails to satisfy one or more criteria comprises determining that the first confidence value is less than a first threshold, and the one or more computer-readable media further store instructions that, when executed, cause the one or more processors to perform acts comprising:
determining that the second confidence value is greater than a second threshold; and
storing, based at least in part on determining that the second confidence value is greater than the second threshold, an indication that the first event is associated with the first hypothesis.

20. The one or more computer-readable media as recited in claim 15, wherein determining that the first confidence value fails to satisfy one or more criteria comprises determining that the first confidence value is less than a first threshold, and the one or more computer-readable media further store instructions that, when executed, cause the one or more processors to perform acts comprising:
determining that the second confidence value is less than a second threshold; and sending at least one of the first sensor data or information for obtaining the first sensor data to one or more computing devices associated with the second hypothesis source.

21. A method comprising:
determining, by a first hypothesis source, a first hypothesis for a result of a first event based at least in part on first sensor data associated with the first event, the first hypothesis indicating that a first user physically picked up a first item;
determining, by the first hypothesis source, a first confidence value indicating an estimation of accuracy of the first hypothesis;
determining a second confidence value indicating a likelihood that a second hypothesis source that is different than the first hypothesis source would generate a hypothesis consistent with the first hypothesis;
storing an indication that the first user physically picked up the first item;
determining, based at least in part on second sensor data, that the first user has exited a facility; and
charging a payment instrument associated with the first user for the first item.

22. The method as recited in claim 21, wherein the first hypothesis source comprises one or more computing devices and the second hypothesis source comprises one or more humans.

23. The method as recited in claim 21, wherein the first hypothesis source comprises one or more computing devices configured to analyze the first sensor data and the second hypothesis source comprises one or more computing devices configured to analyze third sensor data.

* * * * *